(12) United States Patent
Rodriguez, II

(10) Patent No.: US 11,143,867 B2
(45) Date of Patent: Oct. 12, 2021

(54) WRISTWATCH BASED INTERFACE FOR AUGMENTED REALITY EYEWEAR

(71) Applicant: Snap Inc., Santa Monica, CA (US)

(72) Inventor: Jonathan M. Rodriguez, II, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/743,410

(22) Filed: Jan. 15, 2020

(65) Prior Publication Data

US 2020/0150435 A1   May 14, 2020

Related U.S. Application Data

(63) Continuation of application No. 15/686,512, filed on Aug. 25, 2017, now Pat. No. 10,591,730.

(51) Int. Cl.
| | |
|---|---|
| *G02B 27/01* | (2006.01) |
| *G06T 19/00* | (2011.01) |
| *G06F 1/16* | (2006.01) |
| *G06F 21/36* | (2013.01) |
| *G06F 3/01* | (2006.01) |

(52) U.S. Cl.
CPC .......... *G02B 27/017* (2013.01); *G06F 1/163* (2013.01); *G06F 3/011* (2013.01); *G06F 21/36* (2013.01); *G06T 19/006* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 8,854,802 B2 * | 10/2014 | Robinson | G06F 1/1637 361/679.21 |
| 9,310,891 B2 | 4/2016 | Rafii et al. | |
| 9,870,716 B1 | 1/2018 | Rao et al. | |
| 10,591,730 B2 | 3/2020 | Rodriguez, II, et al. | |

(Continued)

OTHER PUBLICATIONS

"U.S. Appl. No. 15/686,512, Examiner Interview Summary dated Oct. 10, 2019", 3 pgs.

(Continued)

*Primary Examiner* — Jason A Pringle-Parker
(74) *Attorney, Agent, or Firm* — Schwegman Lundberg & Woessner, P.A.

(57) ABSTRACT

Augmented reality eyewear devices allow users to experience a version of our "real" physical world augmented with virtual objects. Augmented reality eyewear may present a user with a graphical user interface that appears to be in the airspace directly in front of the user thereby encouraging the user to interact with virtual objects in socially undesirable ways, such as by making sweeping hand gestures in the airspace in front of the user. Anchoring various input mechanisms or the graphical user interface of an augmented reality eyewear application to a wristwatch may allow a user to interact with an augmented reality eyewear device in a more socially acceptable manner. Combining the displays of a smartwatch and an augmented reality eyewear device into a single graphical user interface may provide enhanced display function and more responsive gestural input.

19 Claims, 13 Drawing Sheets

(56) References Cited

U.S. PATENT DOCUMENTS

| | | | |
|---|---|---|---|
| 2003/0201977 A1* | 10/2003 | Hassig | G06F 3/03543 345/163 |
| 2007/0273644 A1* | 11/2007 | Mondine Natucci | H04N 1/00323 345/156 |
| 2008/0120577 A1* | 5/2008 | Ma | G06F 3/0325 715/863 |
| 2008/0266323 A1* | 10/2008 | Biocca | G06F 3/0426 345/633 |
| 2011/0106736 A1 | 5/2011 | Aharonson et al. | |
| 2011/0214082 A1 | 9/2011 | Osterhout et al. | |
| 2013/0215235 A1* | 8/2013 | Russell | H04N 13/243 348/47 |
| 2013/0257736 A1* | 10/2013 | Hou | G06F 3/042 345/168 |
| 2014/0267094 A1 | 9/2014 | Hwang et al. | |
| 2015/0031299 A1 | 1/2015 | Holman et al. | |
| 2015/0040040 A1 | 2/2015 | Balan et al. | |
| 2015/0062003 A1* | 3/2015 | Rafii | G06F 3/017 345/156 |
| 2015/0227118 A1 | 8/2015 | Wong | |
| 2015/0269783 A1* | 9/2015 | Yun | G06F 3/0304 345/633 |
| 2015/0309535 A1 | 10/2015 | Connor | |
| 2015/0309629 A1* | 10/2015 | Amariutei | G06F 1/163 345/173 |
| 2015/0339859 A1* | 11/2015 | Ryu | G06T 19/006 345/633 |
| 2016/0027214 A1* | 1/2016 | Memmott | G02B 27/0172 345/633 |
| 2016/0054791 A1 | 2/2016 | Mullins et al. | |
| 2016/0178906 A1 | 6/2016 | Rider et al. | |
| 2016/0195849 A1* | 7/2016 | Takagi | G06F 3/017 348/40 |
| 2016/0260256 A1* | 9/2016 | Shefi | G06T 19/20 |
| 2017/0344254 A1 | 11/2017 | Zhang et al. | |
| 2018/0053200 A1 | 2/2018 | Cronin et al. | |
| 2018/0137268 A1 | 5/2018 | Sawant et al. | |
| 2018/0332335 A1* | 11/2018 | Mullins | G09G 5/14 |
| 2019/0146219 A1 | 5/2019 | Rodriguez, II | |

OTHER PUBLICATIONS

"U.S. Appl. No. 15/686,512, Non Final Office Action dated Jul. 16, 2019", 27 pgs.

"U.S. Appl. No. 15/686,512, Corrected Notice of Allowability dated Jan. 17, 2020", 6 pgs.

"U.S. Appl. No. 15/686,512, Notice of Allowance dated Nov. 12, 2019", 8 pgs.

"U.S. Appl. No. 15/686,512, Response filed Jul. 3, 19 to Restriction Requirement dated Jun. 14, 2019", 9 pgs.

"U.S. Appl. No. 15/686,512, Response filed Oct. 14, 19 to Non Final Office Action dated Jul. 16, 2019", 17 pgs.

"U.S. Appl. No. 15/686,512, Restriction Requirement dated Jun. 14, 2019", 5 pgs.

\* cited by examiner

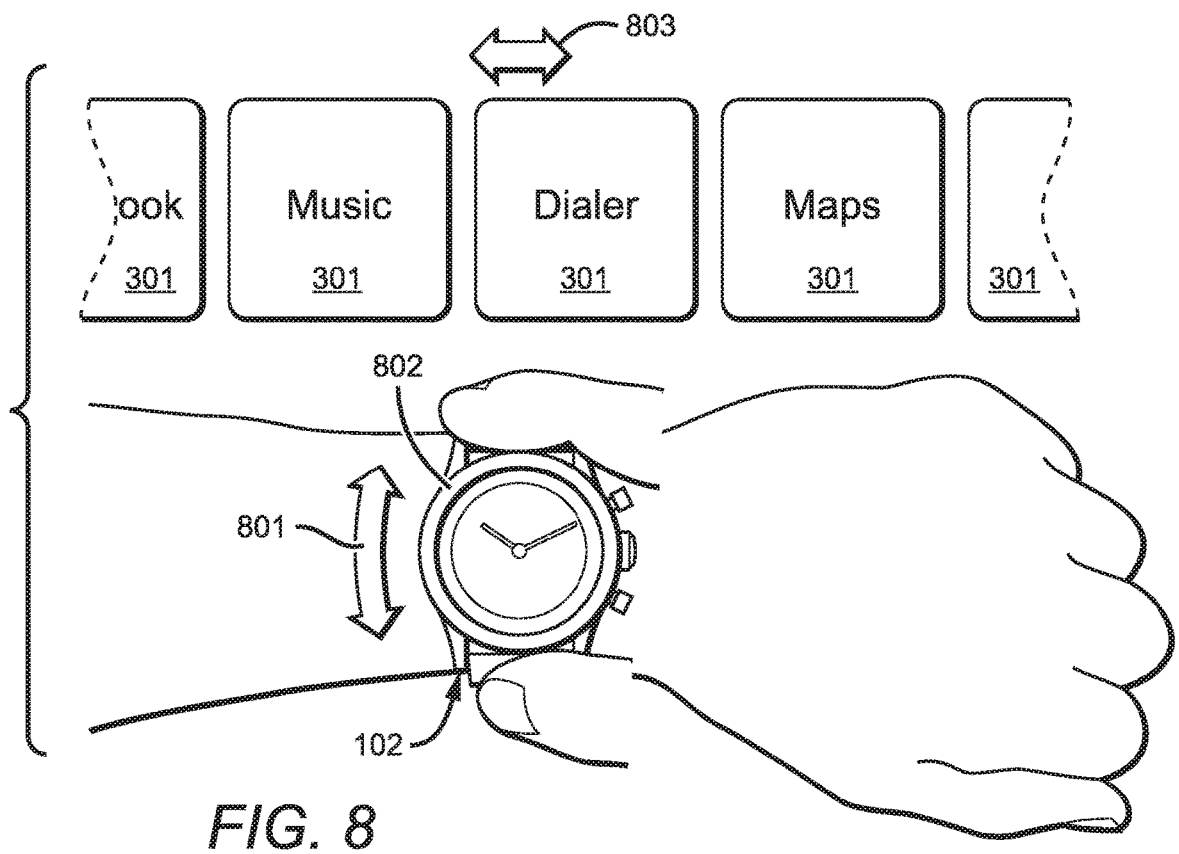
FIG. 8
FIG. 9
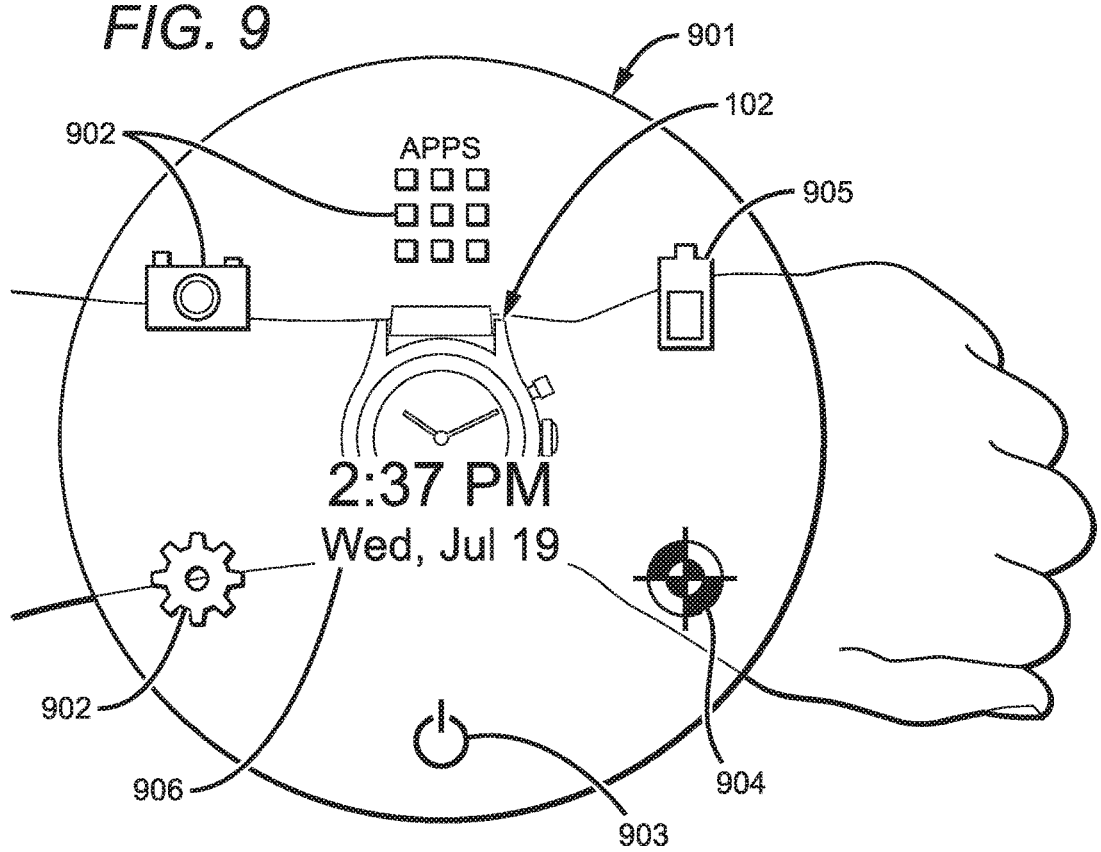

WRISTWATCH BASED INTERFACE FOR AUGMENTED REALITY EYEWEAR

CROSS-REFERENCE TO RELATED APPLICATIONS

This application claims the benefit of priority to and is a continuation of U.S. Non-Provisional application Ser. No. 15/686,512, filed on Aug. 25, 2017.

BACKGROUND OF THE INVENTION

Augmented reality is a version of our "real" physical world augmented with virtual images. Augmented reality may be experienced using various devices such as smartphones, tablets, or augmented reality eyewear. Augmented reality eyewear allows a user to experience augmented reality that may encompass much or all of a user's field of view, without requiring a user to hold a device such as a smartphone or tablet, thus freeing the user's hands for interaction with virtual or real objects. A user wearing augmented reality eyewear may see virtual images displayed in their field of view. Some virtual images may move relative to the real world as a user move's their head. Other images may appear to be fixed in position relative to the real world.

A user of augmented reality eyewear may interact with augmented reality by making hand gestures. For example, a user may swipe vertically in order to scroll a web browser. However, current methods of gestural input for augmented reality eyewear may be socially awkward or may not be intuitive. For example, a third party generally will not be able to see the virtual images that are observed by a user wearing augmented reality eyewear. Such a third party may be confused or disturbed when observing an augmented reality eyewear user swiping, poking, or pinching at the air in front of the user. There is thus a need for a socially acceptable and intuitive method of gestural input for augmented reality eyewear.

BRIEF SUMMARY OF THE INVENTION

Described herein are systems and methods for providing a wristwatch based interface for augmented reality eyewear.

BRIEF DESCRIPTION OF THE DRAWINGS

FIG. 8 illustrates a user simulating rotating a bezel of a wristwatch in order to interact with an application selection interface.

FIG. 9 illustrates a menu interface, as such would appear to a user wearing augmented reality eyewear.

DETAILED DESCRIPTION OF THE INVENTION

Figure 1:
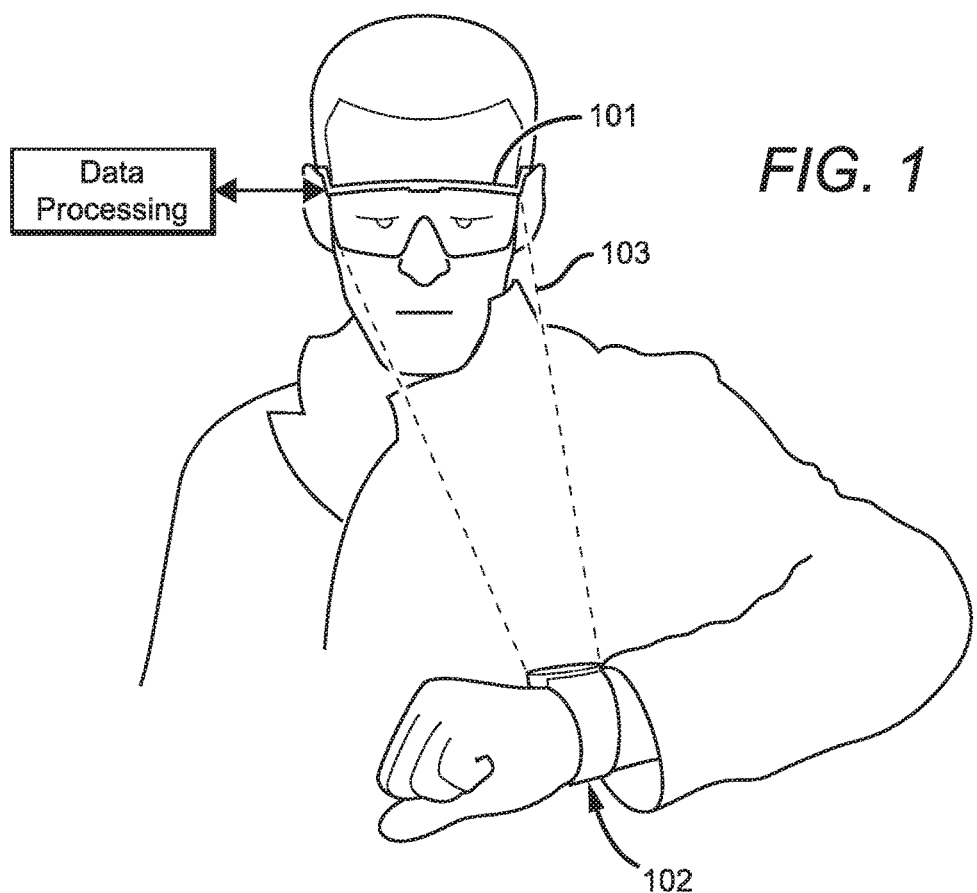
FIG. 1 illustrates an example of an augmented reality eyewear device sensing the positioning of a wristwatch worn by a user.

Various embodiments and aspects of the disclosure will be described with references to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Some portions of the detailed descriptions which follow are presented in terms of algorithms, sequences, or processes which include operations on data stored within a computer memory. The operations typically require or involve physical manipulations of physical quantities. Usually, though not necessarily, these quantities take the form of electrical or magnetic signals capable of being stored, transferred, combined, compared, and otherwise manipulated.

Unless specifically stated otherwise as apparent from the following discussion, it is appreciated that throughout the description, discussions utilizing terms such as "processing" or "computing" or "recognizing" or "calculating" or "determining" or "displaying" or "receiving or the like can refer to the action and process of a data processing system, or similar electronic device, that manipulates and transforms data represented as physical (electronic) quantities within the system's registers and memories into other data similarly represented as physical quantities within the system's memories or registers or other such information storage, transmission or display devices.

The present disclosure can relate to an apparatus for performing one or more of the operation described herein. This apparatus may be specially constructed for the required purpose, or it may comprise a general purpose computer selectively activated or reconfigured by a computer program stored in the computer. Such a computer program may be stored in a machine-readable storage medium.

Augmented Reality Eyewear

Augmented reality eyewear may create an augmented reality space by overlaying virtual images onto the physical world. The augmentation of reality may also be subtractive, and remove from view objects that exist in the physical world. The augmentation of reality may modify the appearance of physical objects in the world or create entirely new virtual objects or phenomenon. The field of view of an augmented reality eyewear device may be referred to as the scene, which may also include non-visual phenomenon that may be detected by various sensors of an augmented reality eyewear device.

Augmented reality eyewear may display images in various ways. Augmented reality eyewear may display virtual images on a transparent or semi-transparent surface that rests in front of the user's field of view. Alternatively, display of virtual images may be accomplished by projecting light into the eye of the user. As augmented reality technology advances, various other methods of displaying virtual object to a user may be utilized.

Augmented reality eyewear may include sensing components, processing components, display components, power source components, interface components, speaker components, and data transmission components.

Sensing components may allow augmented reality eyewear to sense objects and phenomenon in the physical world. For example, augmented reality eyewear may contain visual or quasi-visual sensors such as visible light cameras, time-of-flight cameras, infrared sensors, structured light sensors, laser sensors, micro-radar sensors, or sonar sensors. Some sensors may be passive sensors, such as visible light or infrared sensors, in that they do not emit. Other sensors may be active sensors, such as laser or micro-radar, in that they both emit and receive. Augmented reality eyewear may contain sensors for sensing non-visual data. For example, augmented reality eyewear may contain audio sensors, sonar sensors, an inertial measurement unit, accelerometers, gyroscopes, GPS, magnetometers, altimeters, heartrate sensors, temperature sensors, and various biometric sensors. Sensing components may allow augmented reality eyewear to sense data regarding the positioning and movement of the user and the user's eyes.

Data collected by sensing components may be passed to processing components for processing. Processing components may include a central processing unit, a graphics processing unit, active memory and memory storage. Processing components may dictate the functioning of other components.

Display components may display virtual images to the user of the augmented reality eyewear. Display components may project a virtual image onto a transparent or semi-transparent lens in front of the user's eye such that the user sees the virtual image as well as the real physical world behind said image. Alternatively, display components may project virtual images into the eye of the user, again allowing the user to see the virtual image and the real physical world. Alternatively, display components may produce a holographic image.

An augmented reality eyewear device may also include power source components, such as a battery or solar panels, that provide power to the device.

An augmented reality eyewear device may also include interface components that allow the user to interface with the device. For example, various buttons, touch surfaces, sliders, or microphones that may be positioned on the device.

An augmented reality eyewear device may also include data transmitting components. Data transmitting components may transmit and receive data, thereby exchanging data with other devices or the internet. Such transmitters and receivers may include cellular radio, Bluetooth, Near Field Communication, and WiFi.

An augmented reality eyewear device may also include audio components, such as traditional speakers, bone conduction speakers, hypersonic speakers or directional speakers for presenting audio information to the user.

Tracking and Recognition

Augmented reality eyewear may utilize various sensors and methods known in the art to track and recognize objects in the real world. For at least a decade, augmented reality devices have utilized marker based tracking to track and recognize objects. More recently, augmented reality devices have utilized markerless tracking. As augmented reality eyewear devices evolve, new methods for tracking and recognizing two and three dimensional objects and gestures may emerge. It is appreciated that various sensors and processing techniques may be utilized in the embodiments described herein to recognize and tracking objects and gestures.

It is also appreciated that augmented reality eyewear may recognize and track a wristwatch by recognizing and tracking other objects in the environment. For example, an augmented reality eyewear device may infer the location of a user's wristwatch if the augmented reality eyewear device knows the location of the user's hand and the location of the user's sleeve.

FIG. 1 illustrates an example of an augmented reality eyewear device sensing the positioning of a wristwatch worn by a user. In FIG. 1 a user wears an augmented reality eyewear device 101 and a wristwatch 102. A time-of-flight sensing component of the augmented reality eyewear device and a visible-light sensing camera sense visible light radiation 103 reflected off of the wristwatch. Processing components of the augmented reality eyewear device process the data collected by the sensing components in order to model the shape of the wristwatch and the position of the wristwatch in 3-dimensional space.

Calibrating the Augmented Reality Eyewear

The augmented reality eyewear device may be calibrated in order to more efficiently recognize a specific wristwatch. One method of calibration may be to create a 3D model of a specific wristwatch and to derive many 2D images from such a 3D model. Multiview stereo reconstruction may be one method of producing a 3D model of a wristwatch worn by a user. Modeling of a wristwatch may occur passively or augmented reality eyewear may prompt a user to present the watch in a certain manner and rotate the watch. For example, augmented reality eyewear may prompt the user to place the watch-bearing wrist in the center of the field of view of the augmented reality eyewear and also prompt the user to point to the watch with the non-watch-bearing hand. Some methods of modeling such as feature point modeling may provide efficiency advantages. Once a wristwatch is modeled, augmented reality eyewear may be calibrated such that it may more easily recognize a specific wristwatch and may more quickly and accurately determine the position and orientation of a wristwatch.

Alternatively, a 3D model of a wristwatch, or other types of calibration data, may be provided to an augmented reality eyewear device. For example, a smartwatch may transmit a 3D model of itself to augmented reality eyewear, allowing for faster calibration than if the augmented reality eyewear device had to model the smartwatch from scratch. Augmented reality eyewear may also search a user's purchase history on an online database to determine whether a user has purchased a watch. If a user has purchased a watch and the watch worn by the user matches a watch in the purchase history, augmented reality eyewear may download modeling and calibration data for a purchased watch.

Figure 2:
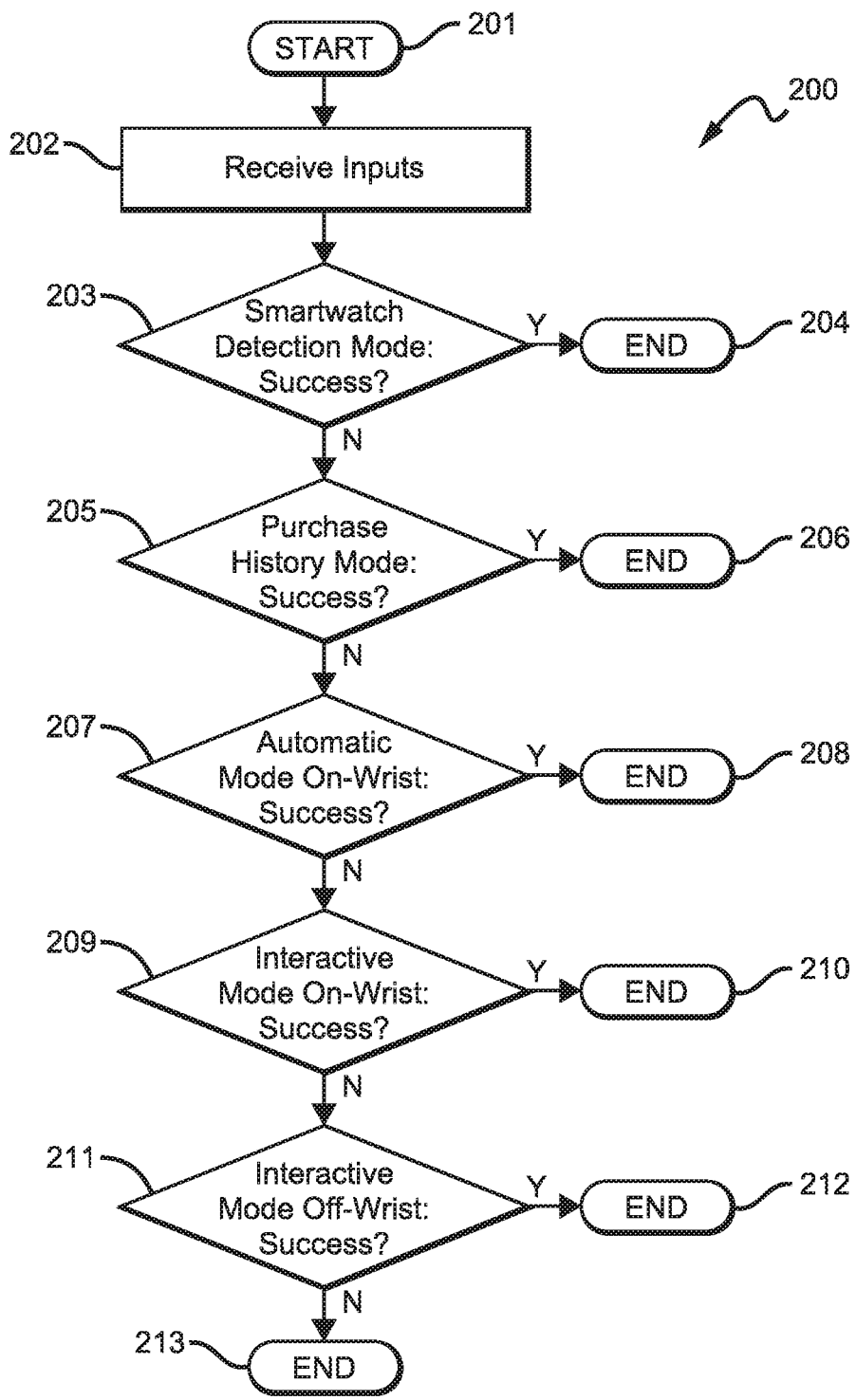
FIG. 2 is a flowchart of a sequence for calibrating augmented reality eyewear to a wristwatch.

FIG. 2 is a flowchart of a sequence 200 for calibrating augmented reality eyewear to a wristwatch. In step 201 a user wears an augmented reality eyewear device and a wristwatch and a calibration sequence is initiated. In step 202 the augmented reality eyewear device may receive input from peripheral devices or devices connected wirelessly.

In step 203 the augmented reality eyewear device enters smartwatch detection mode. If a smartwatch is connected via Bluetooth or WiFi Aware or NFC or any other wireless protocol and the smartwatch supports a protocol that allows the sharing of visual tracking calibration data, then the augmented reality eyewear device obtains calibration data from the smartwatch and the sequence is completed 204. If a smartwatch is connected via Bluetooth or WiFi Aware or NFC or any other wireless protocol, but the smartwatch does not support a protocol that allows the sharing of visual tracking calibration data, then the augmented reality eyewear device attempts to obtain data from the smartwatch that would allow it to determine the make and model of the smartwatch. If the augmented reality eyewear device is successful in determining the make and model of the smartwatch it attempts to obtain calibration data using online images of said smartwatch or to download calibration data from an online database. If the augmented reality eyewear device obtains calibration data in this manner the sequence is completed.

While in Smartwatch Detection Mode, if the augmented reality eyewear device is not already connected to a smartwatch, it performs a scan of Bluetooth, NFC, WiFi Aware or other wireless protocols to see if a smartwatch is nearby. If multiple wireless signals are detected nearby the augmented reality eyewear device performs the following subsequence, beginning with the signal with the highest signal strength and ending with the signal with the lowest signal strength: If the signal strength is below a certain threshold, indicating that there is no reasonable chance that the smartwatch is currently being worn on the wrist of a user, then the augmented reality eyewear device moves on to the next signal. If the signal strength is not below the threshold, the augmented reality eyewear examines the signal and uses a database to determine whether the signal comes from a smartwatch and attempts to determine the make and model of the smartwatch. If the signal does not belong to a smartwatch, the augmented reality eyewear moves on to the next signal. If the signal does belong to a smartwatch, the augmented reality eyewear prompts the user, asking whether the smartwatch that has been detected is the user's smartwatch. If the smartwatch does not match the user's smartwatch, the augmented reality eyewear moves to the next signal. If the smartwatch does match the user's smartwatch, the augmented reality eyewear device may prompt the user further in order to determine make and model if make and model data were not determined earlier. Once make and model are determined, the smartwatch will attempt to obtain calibration data in any manner previously discussed and if calibration data is successfully obtained that sequence will be completed.

If the augmented reality eyewear is unable to obtain calibration data in Smartwatch Detection Mode, step 203, it enters Purchase History Mode, step 205. If the augmented reality eyewear device has access to the user's purchase history for an online retailer or proprietary ecosystem it performs the following subsequence while in Purchase History Mode: The device sets a time limit. The device, in a "parallel for loop," searches for images of a watch in the user's purchase history and compares such images to images of the scene, which may include a watch. This process continues until the predetermined time limit is reached, at which point the device moves to step 207. If a watch in the purchase history is matched to a watch in the device's current environment before the time limit is reached, the augmented reality eyewear device attempts to obtain calibration data in any manner previously discussed. If calibration data is obtained the sequence is completed 206. For optimal performance, it is recommended that step 205 and step 207 shall be performed simultaneously, on separate threads.

In step 207 the augmented reality eyewear device enters Automatic Mode On-Wrist. In this step, the augmented reality eyewear device attempts to visually model a user's wristwatch without active input from the user. The device first sets a time limit such as 30 second. If it is known that the user always wears their watch on their left wrist, the augmented reality eyewear device will search the scene for the user's left hand. If it is known that the user always wears their watch on their right wrist, the augmented reality eyewear device will search the scene for the user's right hand. If the user is known to wear a watch on both wrists, or their preference is not known, the augmented reality eyewear device will search for either hand simultaneously. In searching for a hand, the augmented reality eyewear will set allowable retries for each hand to a certain number. If the frame rate of the computer vision system is slow, such as 1 frame per second, then an appropriate number of allowable retries might be in the approximate realm of 5 to 10 retries. If the frame rate of the computer vision system is fast, such as 60 frames per second, then an appropriate number of allowable retries might be in the approximate realm of 300 to 600 retries. When a hand is detected the augmented reality eyewear device may search an area near the hand for anything that looks like a wrist or a watch. If a watch is identified, the augmented reality eyewear device will attempt to construct a 3D model of the watch, update the watch calibration data, and complete the sequence 208. If no watch is detected, the value for allowable retries will be reduced by 1 for the hand near which a watch was searched for. Once allowable retries for both the left and right hand are reduced to zero or once the time limit has elapsed, the augmented reality eyewear device moves to step 209.

In step 209 the augmented reality eyewear device enters Interactive Mode On-Wrist. The device first asks the user if the user is wearing a watch. If the user answers in the negative, the device sets a variable indicating that the user is not wearing a watch and the sequence is completed 210. If the user answers in the affirmative, the device prompts the user to present or point out the watch while it is being worn. For example, one way to do this would be to ask the user to use their non-watch-bearing hand to point at the watch. The device simultaneously searches for cues such as: the image of a watch, a hand making a pointing gesture, or a hand not making a gesture. If the device recognizes a hand making a pointing gesture or a hand not making a pointing gesture the device searches near such cues for a wrist or watch. If a wrist is recognized, the device looks more intensely for a watch.

If a watch is not located, the device continues searching for a time limit. If no watch is found in the time limit, the device moves to step 211. If a watch is located during the Interactive Mode On-Wrist, the device sets an allowable number of re-prompts and begins 3D reconstruction. The device prompts the user to rotate the user's watch-bearing wrist as needed to reconstruct the entire watch. If the reconstruction is successful, the device's calibration data is updated and the sequence 210 is completed. If the reconstruction is not successful, the device reduces the number of allowable re-prompts and prompts the user again. Once the number of allowable re-prompts reaches zero, the device moves to step 211.

In step 211 the device enters Interactive Mode Off-Wrist. In this mode, the device prompts the user to remove the user's watch and place the watch on a flat surface such as a table or counter. The device may indicate to the user that for best results, the surfaced should be a solid color, not patterned or textured. The device may then prompt the user to begin taking multiple photographs of the watch either using their augmented reality eyewear device or using their smartphone, whatever they are more comfortable with. The augmented reality eyewear device may prompt the user to take the first photograph from a vantage point directly over the center of the watch face, looking down at it. If a watch is not detected, the augmented reality eyewear device will prompt the user to attempt the first photograph again. If a watch is detected by the augmented reality eyewear device, the augmented reality eyewear device begins 3D reconstruction, starting with the first photograph. 3D reconstruction continues as the augmented reality eyewear prompts the user to take photos of the watch from all angles. Even as a user is prompted to take photographs, the augmented reality eyewear device may take photographs continually, even when the user is not manually taking photographs, in order to collect a lot more calibration data with less user effort. If any specific vantage points have missing or low-quality information the augmented reality eyewear device may prompt the user to take a photograph from that specific angle. The instructions may be verbal or graphical or both. Graphical instructions may be pictographic drawings that were created by a human in advance, or they may consist of 3D AR imagery that is generated on the fly and may be shown on the glasses or the smartphone. Once enough images are gathered to create a sufficiently accurate 3D reconstruction, the augmented reality eyewear device alerts the user that calibration is complete, updates its calibration data and completes sequence 212. If Interactive Mode Off-Wrist is unsuccessful, sequence 213 is completed without updating calibration data.

Wristwatch Anchored Graphical User Interface

In some current applications of augmented reality eyewear, virtual images displayed by the augmented reality eyewear device are fixed with respect to the device and thus move in relation to the real physical world as the user moves or turns their head. However, virtual images may also be anchored to real objects in the physical world, such that the virtual image maintains its positioning in relation to a real physical object even as the user and the real physical object move. An example of augmented reality anchoring would be a virtual image of a baseball cap, overlaid onto the head of a human. As the human moves or turns, the virtual baseball cap would move in a corresponding fashion such that the illusion of the baseball cap being worn by the human is maintained as the human moves. Maintaining said illusion may require the virtual image to move in three-dimensional space, rotate, as well as adjusting size, color, shading and clarity.

Figure 3:
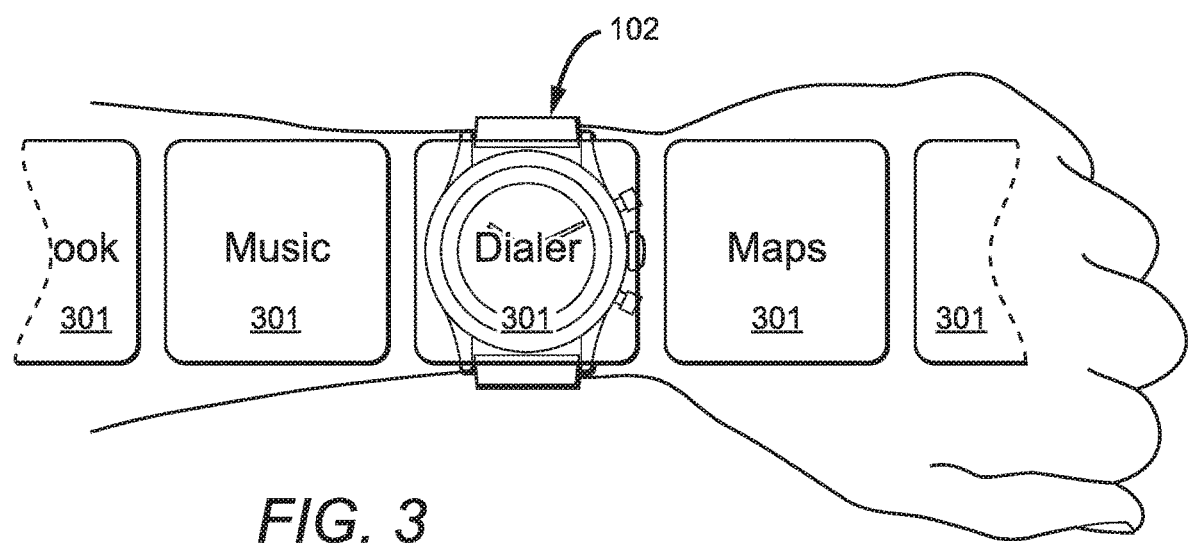
FIG. 3 illustrates an example of an application selection interface anchored to a user's wristwatch.

FIG. 3 illustrates an example of a graphical user interface anchored to a user's wristwatch, as such would appear to a user wearing augmented reality eyewear. In FIG. 3 a user wearing an augmented reality eyewear device is looking at the face of a wristwatch 102. The augmented reality eyewear application may have a graphical user interface. Such a graphical user interface may be anchored to a real physical object such as a wristwatch worn by the user. One example of a graphical user interface anchored to a user's wristwatch may be an application selection interface. The augmented reality eyewear may display a series of application icons 301 in the airspace near the forearm and hand of the user. As displaying icons for all available applications may be impractical, the application interface may show a subset of available application icons and indicate that more application icons are available. The user may interact with the virtual icons in a similar manner as a user would interact with virtual icons on the touchscreen display of a smartphone or tablet. For example, the user may select an application to run by tapping at the location in three-dimensional space where the virtual application icon appears. The user may also swipe left or right to view more application icons.

When a user of augmented reality eyewear focuses his gaze on his wristwatch, third parties may intuitively understand that the user is interacting with a device. If, on the other hand, the application icons were simply displayed in the empty airspace directly in front of the user, the user would be required to swipe or tap in the empty airspace in front of the user. In such a situation, a third party may mistakenly believe that the user is trying to interact with said third party or another person or object that exists in the real world. By anchoring the graphical user interface to a wristwatch, a wearer of augmented reality eyewear may reduce the incidence of awkward or confusing interactions with third parties. Moreover, many users and third parties may be familiar and comfortable with individuals interacting with smartwatches. When a user makes a swiping or tapping motion in the vicinity of a wristwatch, the gestures may not appear to be particularly unusual.

Figure 3A:
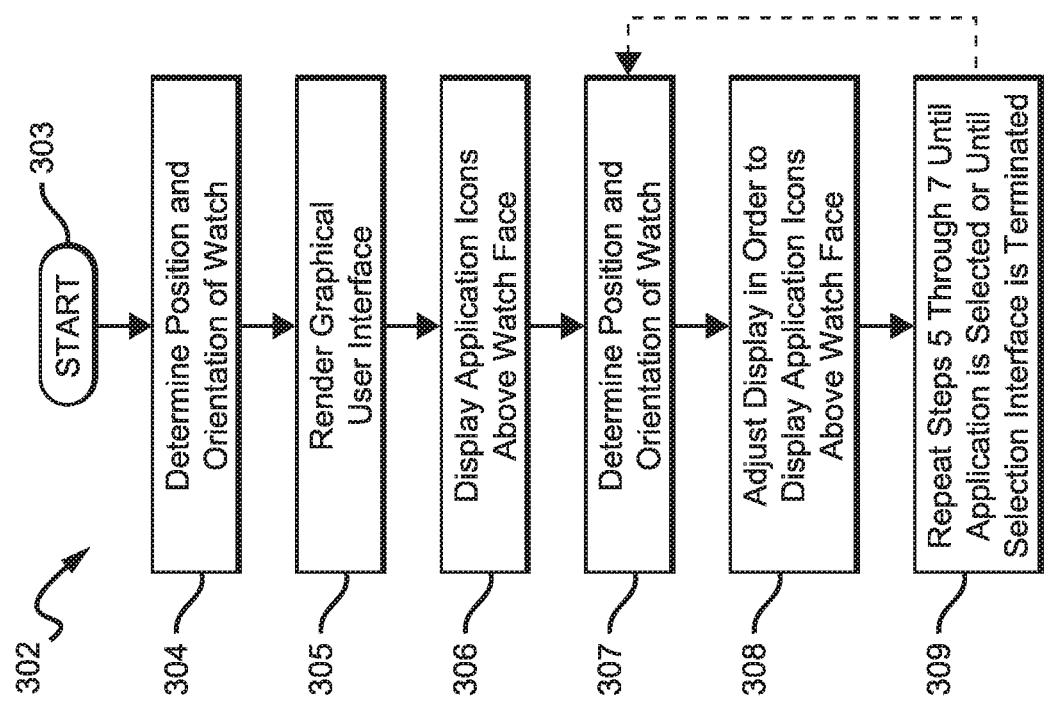
FIG. 3a is a flowchart of a sequence for anchoring the graphical user interface of an application selection interface to a user's wristwatch.

FIG. 3a is a flowchart of a sequence 302 for anchoring the graphical user interface of an application selection interface to a user's wristwatch. In step 303 a user wears an augmented reality eyewear device and a wristwatch and activates an application selection interface. In step 304 the augmented reality eyewear device determines the position and orientation of the wristwatch. The augmented reality eyewear device may utilize calibration data or data provided by a smartwatches inertial measurement unit to assist in determining the position and orientation of the wristwatch. In step 305 the augmented reality eyewear device renders a graphical user interface. In step 306 the augmented reality eyewear device displays an application interface such that application icons appear in a horizontal line across the forearm of the user with one application icon above the watchface. The augmented reality eyewear device continuously determines 307 the position and orientation of the wristwatch and adjusts 308 the image of the graphical user interface accordingly. The augmented reality eyewear device repeats 309 determining 307 the position and orientation of the watch and adjusting 308 the image accordingly until an application is selected or the application selection interface is terminated.

Figure 4:
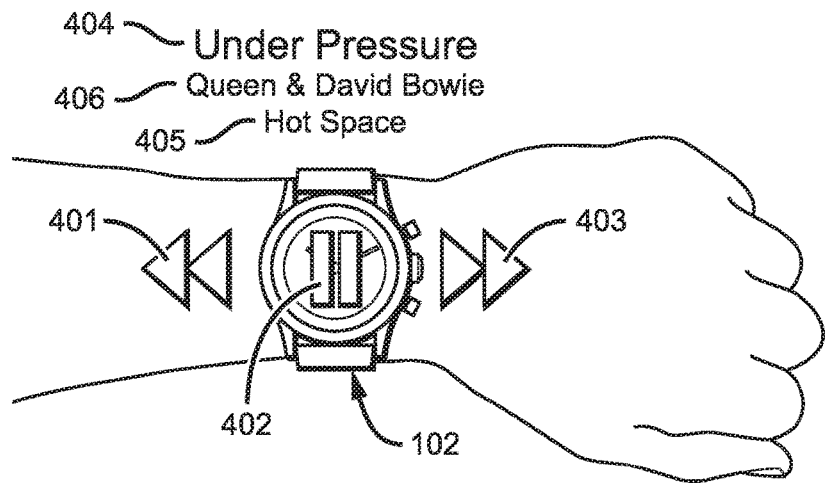
FIG. 4 illustrates an example of a music player application interface anchored to a user's wristwatch.

FIG. 4 illustrates an example of a music player application interface anchored to a user's wristwatch 102, as such would appear to a user wearing augmented reality eyewear. In FIG. 4, a graphical user interface of a music player application is displayed by an augmented reality eyewear device. Control buttons for the music player application, such as track-back 401, play-pause 402, and track forward 403 may be anchored to the user's wristwatch and displayed in the airspace near the user's forearm, the user's wristwatch and the user's hand. Information regarding the track 404, album 405, and artist 406 may be displayed above the wristwatch. The user may interact with the virtual controls by making a button-pressing gesture in proximity to the virtual button.

Figure 5:
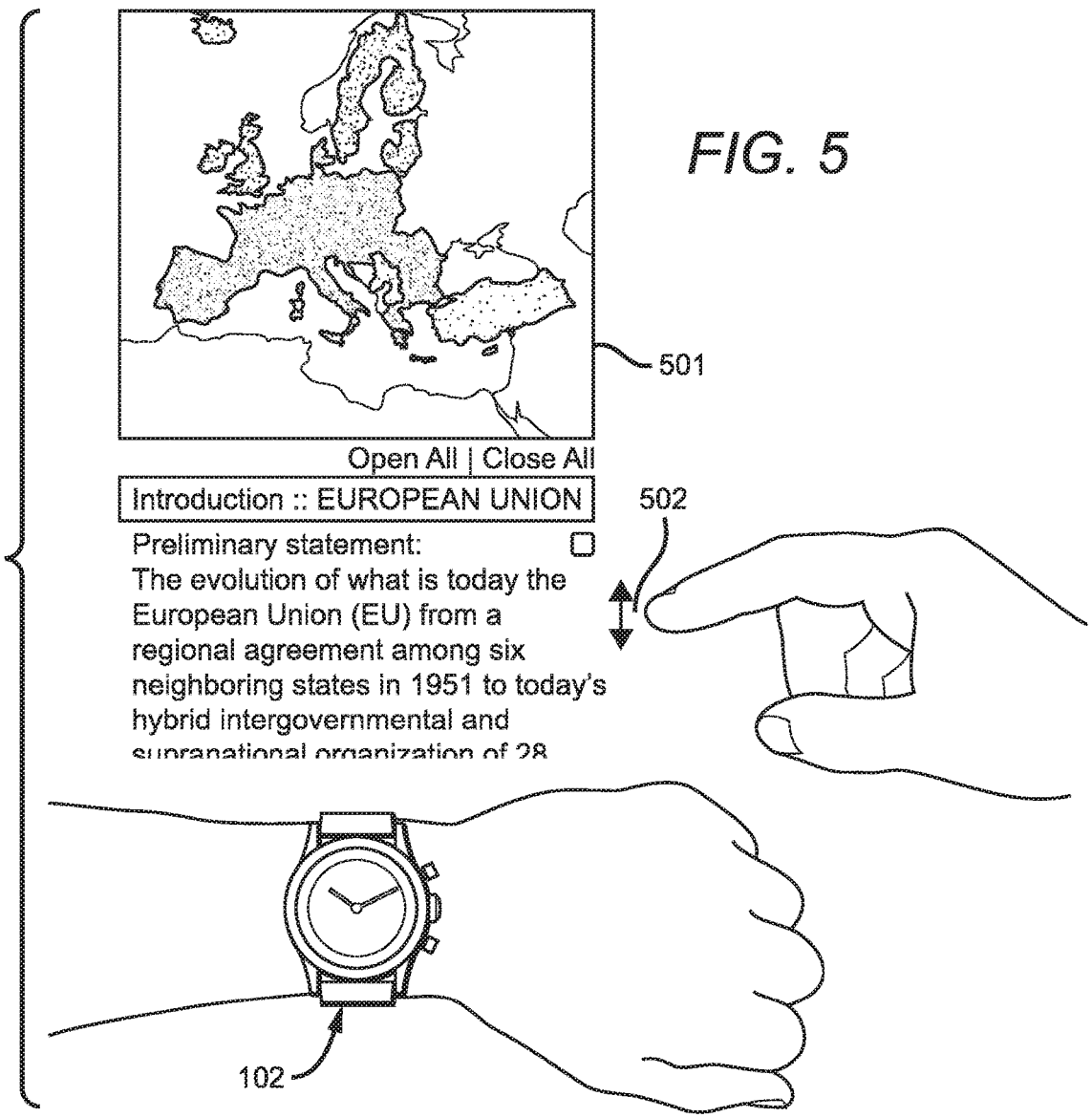
FIG. 5 illustrates an example of a web browser application interface anchored to a user's wristwatch.

FIG. 5 illustrates an example of a web browser application interface anchored to a user's wristwatch 102, as such would appear to a user wearing augmented reality eyewear. In FIG. 5, a graphical user interface 501 of a web browser application is displayed by the augmented reality eyewear device. The web browser window may be displayed above the user's wristwatch 102 in a plane that is substantially perpendicular to the watch face. The user may again interact with the web browser in a similar fashion as a user might interact with a web browser on the touchscreen of a smartphone or tablet with multi-touch functions. A user may interact with the web browser application by tapping, pinching to zoom, scrolling 502, or swiping. A user may also use three-dimensional gestures to interact with the graphical user interface. For example, in order to close a window, a user could make a crumpling and tossing gesture to simulate crumpling and tossing away a piece of paper.

Figure 6:
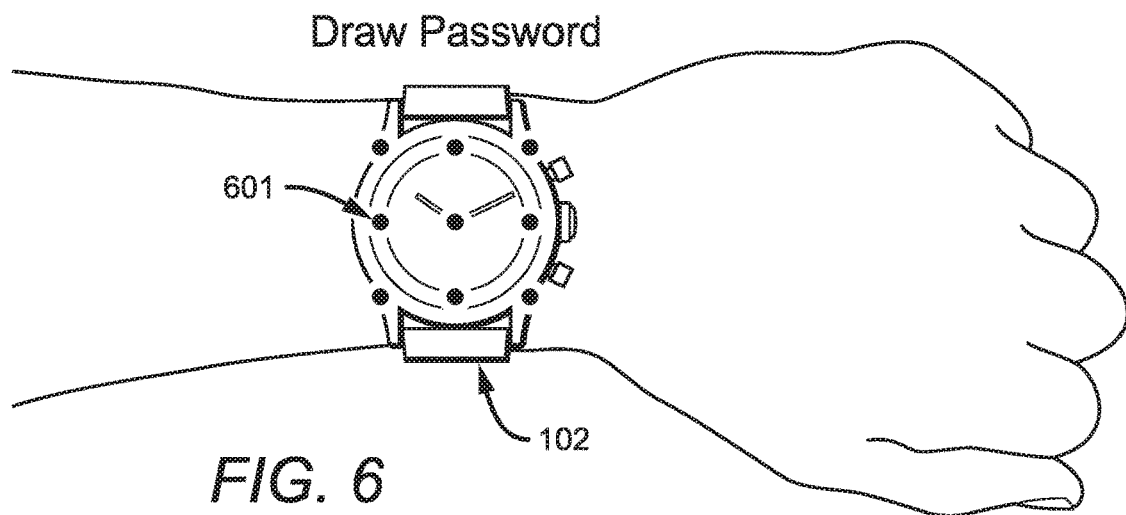
FIG. 6 illustrates an example of a dot lock interface anchored to a user's wristwatch.

FIG. 6 illustrates an example of a dot lock interface 601 anchored to a user's wristwatch 102, as such would appear to a user wearing augmented reality eyewear. In FIG. 6 the graphical user interface of a dot lock application is displayed in the airspace in front of the user's wristwatch 102. Dot lock screens are used to prevent unauthorized access to electronic devices with touchscreens. To unlock such a device, a user draws a pattern between a number of dots. Here, the user may draw such a pattern between virtual dots in the airspace in front of the user's wristwatch. The dot lock virtual image may also be three dimensional, creating a more secure dot lock password.

The anchoring of the GUI to the wristwatch may be made more realistic by reducing the latency from when the watch and/or eyewear moves to when the rendered graphics are redrawn. Several techniques may be used to substantially reduce this latency:

a. In the eyewear's one or more cameras used for tracking, the exposure time may be lowered. Although this would make a photo viewed by a human look bad, for a computer vision algorithm, that is not a concern.

b. In the eyewear's one or more cameras used for tracking, the resolution may be reduced to the minimum amount acceptable by the computer vision algorithm. The resolution may be adaptively increased again later, temporarily, if the vision algorithm loses confidence in its tracking, then reduced back to the lower resolution after the vision algorithm regains confidence.

c. In the eyewear's one or more cameras used for tracking, the "cropping" or "windowing" setting may be utilized to only look at a small region surrounding the watch. Looking at fewer pixels' worth of area allows those pixels to be read more times per second within a given image-processing pipeline of fixed bandwidth.

d. When writing to the eyewear's one or more displays, the eyewear may write only the pixel rows and columns that are strictly necessary to display the GUI, without wasting any time writing to rows or columns that are all black.

e. When writing to the eyewear's one or more displays the eyewear may utilize interlacing. That is, the eyewear may write only to odd-numbered rows on one frame/field, then only to even-numbered rows on the next frame/field, over and over, allowing twice as many frames/fields to be displayed per second.

f. The eyewear's overall tracking and rendering system may utilize the technique known in the art as "racing the beam". This means that while the eyewear scans a particular row with the one or more cameras, it may immediately update the one or more rows on the one or more displays that correspond positionally to that camera row. This avoids any unnecessary latency that would be incurred if a less optimal algorithm was used that updated rows in the one or more displays corresponding to a position that had been scanned by the one or more cameras many milliseconds ago.

g. If the watch being tracked is a smartwatch and contains its own IMU, the eyewear may utilize the latest IMU readings coming from the smartwatch to update the rendered position of the graphics "blindly". That is, if the eyewear possesses IMU readings that are more recent than the latest camera-based visual tracking data, then the eyewear may take it on faith that the IMU readings are accurate, and update the displayed graphics in accordance with the IMU updates. If it later turns out that the IMU readings were inaccurate, then the displayed graphics may be corrected at that later time, possibly resulting in a small "jump" as the graphics jump from the incorrect position to the correct position.

Traditional Wristwatch Gestures

Users of traditional wristwatches may interact with a wristwatch in a number of ways. A user may turn a crown to adjust the time, press a button to start or stop a timer, or rotate a bezel. Such movements may feel intuitive or natural for a user operating a graphical interface that is anchored to a wristwatch.

Figure 7A:
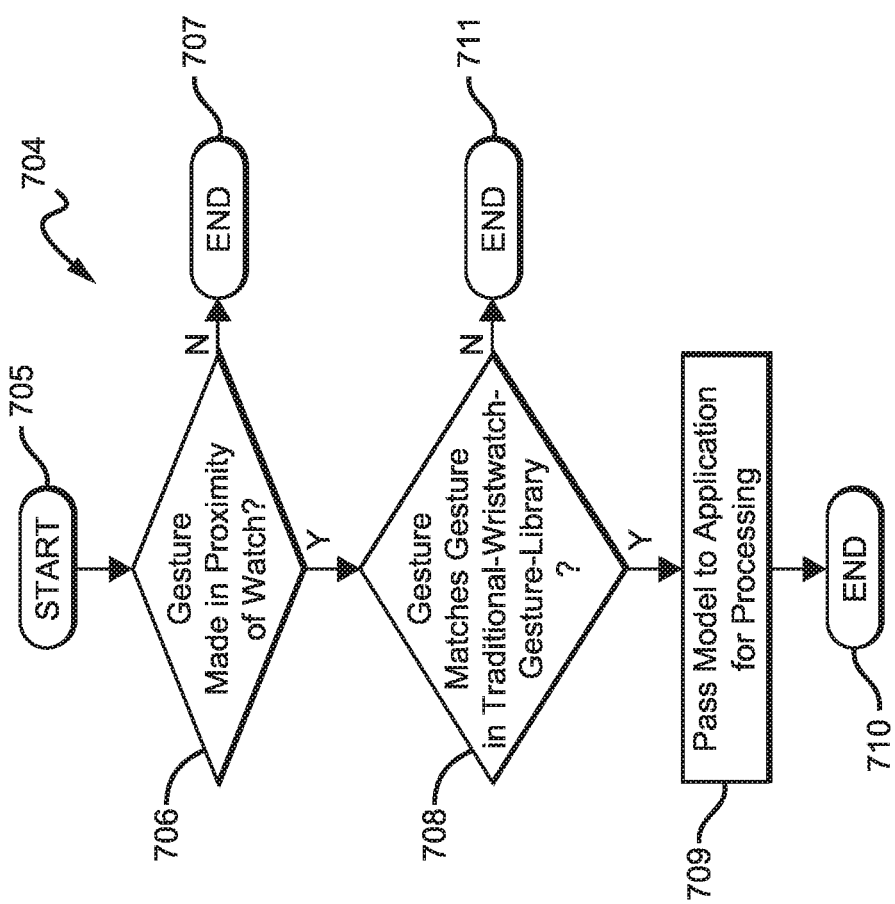
FIG. 7a is a flowchart of a sequence for recognizing and implementing traditional wristwatch gestures.
Figure 7:
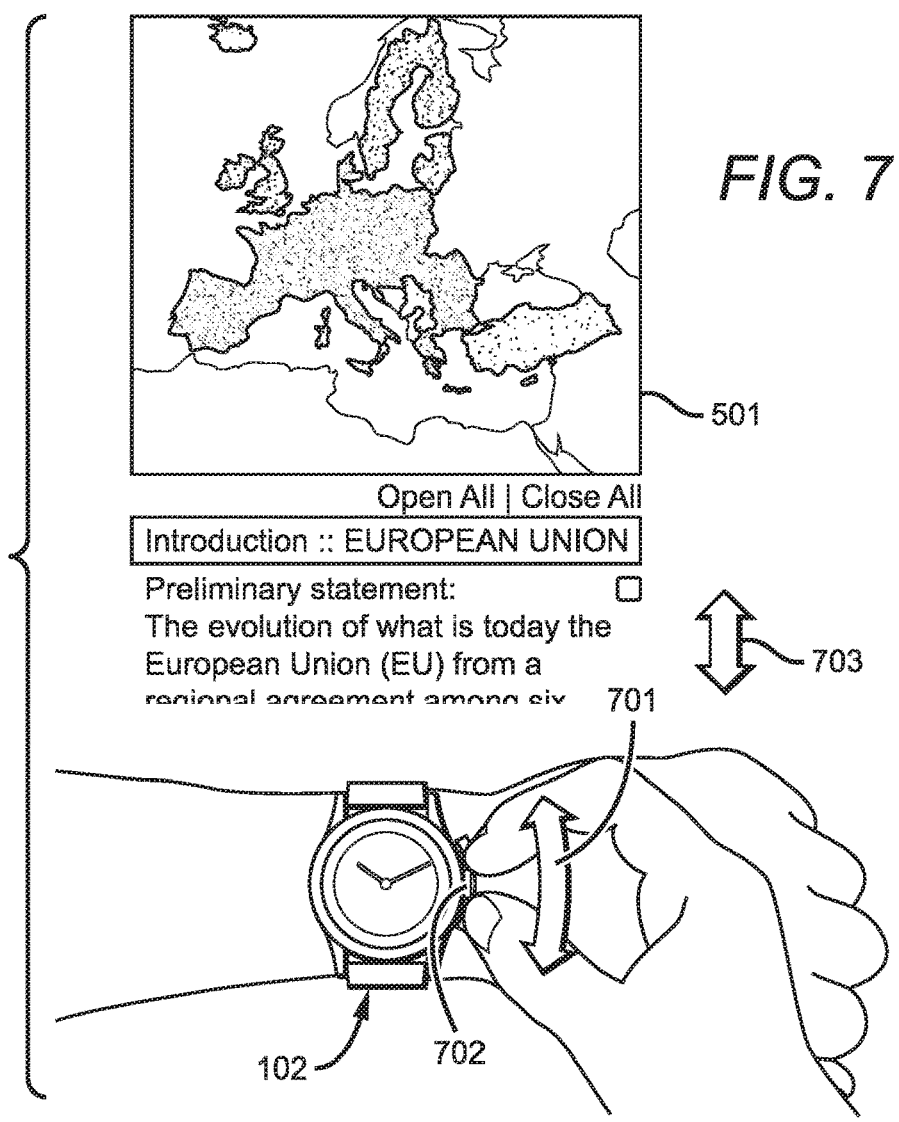
FIG. 7 illustrates a user simulating twisting a crown of a wristwatch in order to interact with a web browser application.

FIG. 7 illustrates a user simulating a crown-twisting motion in order to interact with web browser application, as such would appear to a user wearing augmented reality eyewear. In FIG. 7 a graphical user interface 501 of a web browser is displayed in the airspace above a user's wristwatch 102. The user may simulate twisting 701 the crown 702 of a wristwatch in order to interact with the web browser. For example, by simulating twisting 701 the crown 702 of the wristwatch 102, the user may cause the graphical user interface 501 web browser to scroll 703.

FIG. 7a is a flowchart of a sequence 704 for recognizing an implementing traditional wristwatch gestures. A user wears an augmented reality eyewear device that is running an application and wears a wristwatch. In step 705 the user initiates the sequence by making a hand gesture with the non-watch-bearing hand. In step 706 the augmented reality eyewear determines whether a gesture is made within a certain distance of the watch. If a gesture is made in proximity of the wristwatch, the augmented reality eyewear moves to step 708. If a gesture is not made in proximity of the wristwatch, the sequence is completed 707. In step 708 the augmented reality eyewear compares the gesture to a traditional-wristwatch-gesture-library. The traditional-wristwatch-gesture-library may contain models of gestures that a user of wristwatch may traditionally make, such as twisting a crown, pressing a button, or rotating a bezel. If the gesture matches a model from the traditional-wristwatch-gesture-library, that model is passed 709 to the application for processing and the sequence is completed 7010. If the gesture does not match a model from the traditional-wrist-watch-gesture-library, the sequence is completed 7011.

FIG. 8 illustrates a user rotating the bezel of a wristwatch to interact with a web browser application, as such would appear to a user wearing augmented reality eyewear. In FIG. 8 a graphical user interface of an application selection interface is displayed in the airspace above a user's wristwatch 102. The user may simulate rotating 801 the bezel 802 of the wristwatch in order to interact with the web browser. For example, by simulating rotating 801 the bezel 802 of a wristwatch 102, the user may cause application icons 301 to scroll 803 horizontally.

Wrist Gestures

A user may interact with a wristwatch anchored graphical user interface with the hand that is not wearing the wristwatch. A user may also interact with an augmented reality eyewear device by making gestures with the wrist that wears the wristwatch.

FIG. 9 illustrates a menu interface, as such would appear to a user wearing augmented reality eyewear. A user may access such a menu interface by bringing the watch face of a wristwatch 102 into the center of the user's field of view, as if the user were checking the time on a standard wristwatch. The augmented reality eyewear may sense this gesture and may respond by activating the augmented reality display and displaying a the graphical user interface 901 of a menu interface to the user. A menu interface may contain application icons 902, a power function 903, a calibration function 904, a battery indicator 905 and time and date information 906. Of course, a menu interface may contain various combinations of applications, functions and system information. If the user removes the wristwatch from the field of view of the augmented reality eyewear before making any selections within the menu interface, the augmented reality display may be deactivated. On the other hand, depending on the user's input within the menu interface, augmented reality display functions may or may not continue after the wristwatch is removed from the field of view of the augmented reality eyewear. An augmented reality eyewear device may possess a wrist-gesture database and perform a sequence similar to the sequence discussed above for traditional wristwatch gestures in order to recognize and interpret wrist-gestures.

Another example of a gesture made with the hand that wears the wristwatch would be a quick wrist-twisting gesture, mimicking a gesture that might be made by a user to adjust the placement of the wristwatch on the wrist. Such a gesture may be used as a swift activation gesture for an application such as a camera application that users may want to activate immediately, without having to go through a menu or application selection interface.

Additionally, a user may make gestures that utilize both hands in order to interact with real or virtual objects. For example, a user may be in a room that contains multiple smart appliances such as one or more smart light bulbs and a smart television. A user may select between such smart appliances by first bringing the wristwatch into the scene such that the face of the wristwatch is pointing upwards. A user may then bring the user's other hand into the scene and make a pointing gesture, by laying the user's index finger across the face of the wristwatch such that the user's index finger points in the direction of the desired smart appliance. If for example, the user points to a smart light bulb in this fashion, the smart light bulb may turn on or off, or a menu may appear by which a user may dim the bulb or change its color. This method of selection by pointing may be useful in various instances such as if a user is far away from a real object that the user would like to select. For example, a user may see a restaurant from across a street and desire to view reviews for the restaurant. By making a pointing gesture across the face of the user's wristwatch, a user may select said restaurant and interact with information related to the restaurant.

The augmented reality eyewear device may allow the user to program gestures to activate various applications or perform functions. Additionally, certain apps may be allowed to attempt to register a recommended gesture or set of gestures, which the user may give or deny permission to do.

Simulated Planar Shift Input Interface

Users of traditional desktop computers interface with a computer's graphical user interface using a mouse and keyboard. The mouse is an example of a planar shift input interface. The graphical user interface of a traditional computer is presented in a vertical two-dimensional plane via a display monitor. The mouse or touchpad operates in a horizontal two-dimensional plane. Thus, when a user moves the mouse forward, the cursor on the graphical user interface moves up and when the user moves the mouse backward, the cursor on the graphical user interface moves the cursor downward.

Figure 10A:
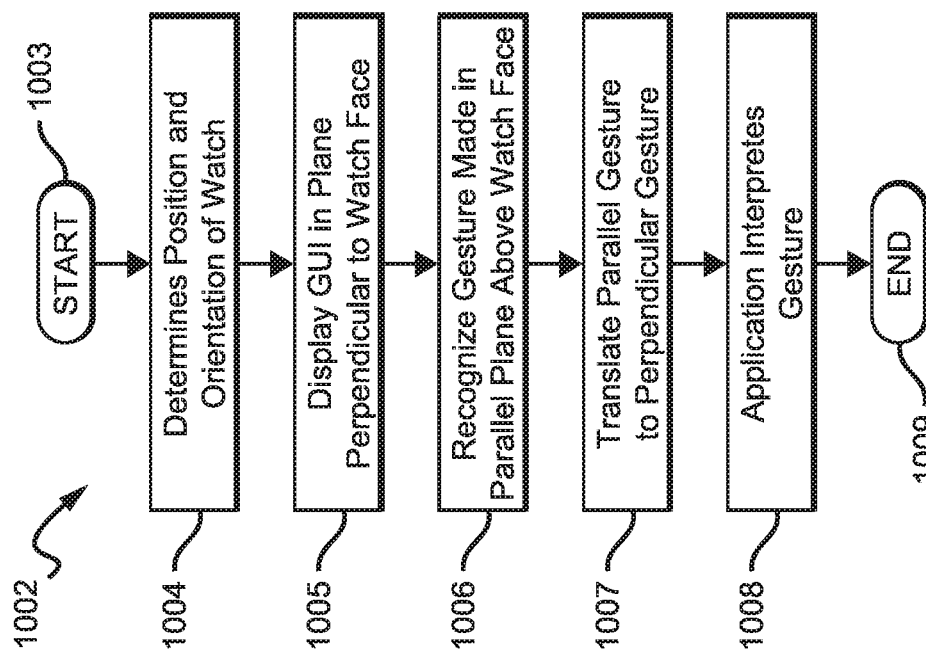
FIG. 10a is a flowchart of a sequence for interpreting planar shift gestures made in the vicinity of a wristwatch.
Figure 10:
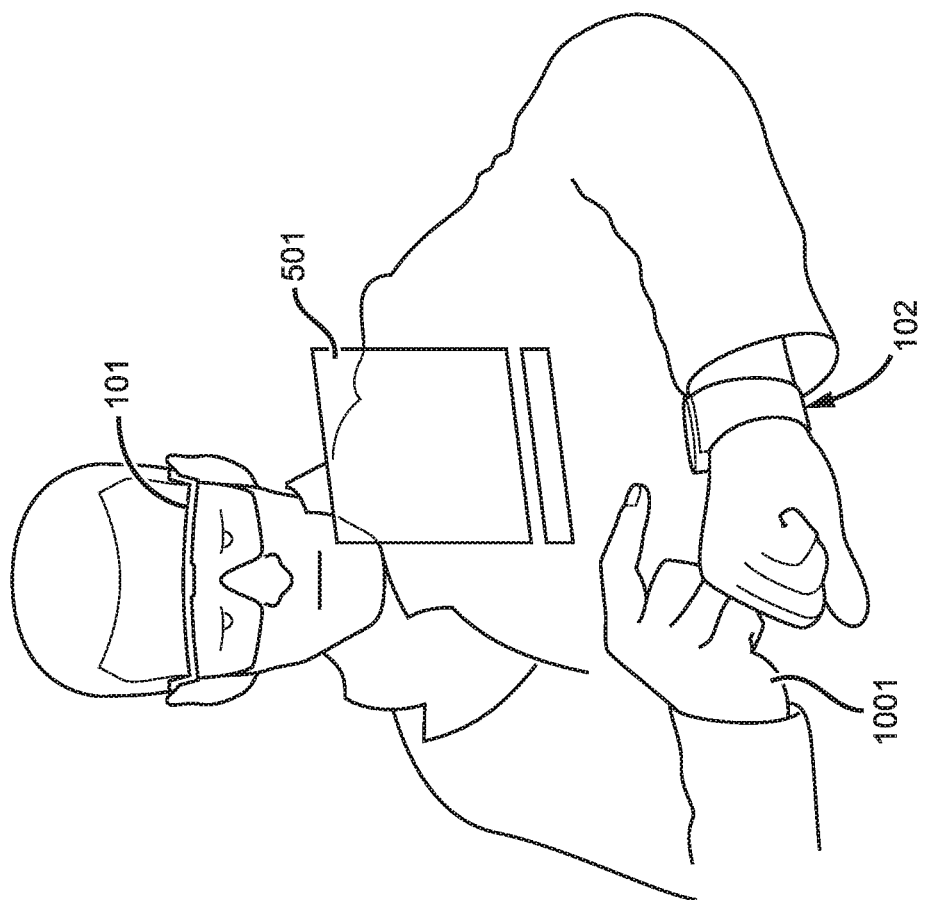
FIG. 10 illustrates a wristwatch being used as a simulated planar shift input interface.

FIG. 10 illustrates a wristwatch being used as a simulated planar shift input interface. In FIG. 10 a user wears an augmented reality eyewear device 101 and a standard wristwatch 102 on the user's left wrist. The user may position the wristwatch 102 in front of the user with the watch face pointing upwards. In FIG. 10 the augmented reality eyewear device 101 displays a graphical user interface 501 of a web browser window in plane above the face of the user's wristwatch 102 in a plane that is substantially perpendicular to the face of the wristwatch 102. The user may interact with the web browser window by moving the user's right hand 1001 in the horizontal plane above the user's wristwatch and below the web browser. If the user is wearing a smartwatch, the touchscreen of the smartwatch may be used in this manner similarly to a touchpad on a laptop computer.

FIG. 10a is a flowchart of a sequence 1002 for interpreting planar shift gestures made in the vicinity of a wristwatch. A user wears an augmented reality eyewear device and a wristwatch. In step 1003 an application is initialized. The augmented reality eyewear device determines 1004 the position and orientation of the user's watch. In step 1005 the augmented reality eyewear displays the graphical user interface of the application in a plane perpendicular to the face of the watch. In step 1006 the augmented reality eyewear device recognizes a hand gesture made in the parallel plane above the watch face. The augmented reality eyewear then translates 1007 the gesture from a gesture that is parallel to the watch face to a gesture that is parallel to the web browser's graphical user interface. The application then interprets 1008 the gesture, which is now parallel to the web browser's graphical user interface and the sequence is completed 1009. The planar shift need not be perpendicular or even substantially perpendicular. For example, while the input plane may be parallel to the watch face, the plane of the graphical user interface may be at an angle of 60 degrees with respect to the watch face for a better viewing angle.

Scaled Duplicate Interface

In various augmented reality eyewear applications, a user may wish to interact with a three-dimensional object. For example, a furniture designer may wish to rotate a virtual three-dimensional model of a kitchen table in order to view the model from different angles. If the model is enlarged such that it encompasses a large portion of a user's field of view, intuitive interaction with such a model may cause a user to make grand, sweeping gestures that are in proportion to the scale of the model. For example, an intuitive method of rotating a full-sized, virtual kitchen table may be to extend the right arm all the way to the right and swipe all the way across the body to the left. A scaled duplicate interface may allow a user to interact with a large three-dimensional virtual object without making such sweeping gestures.

Figure 11A:
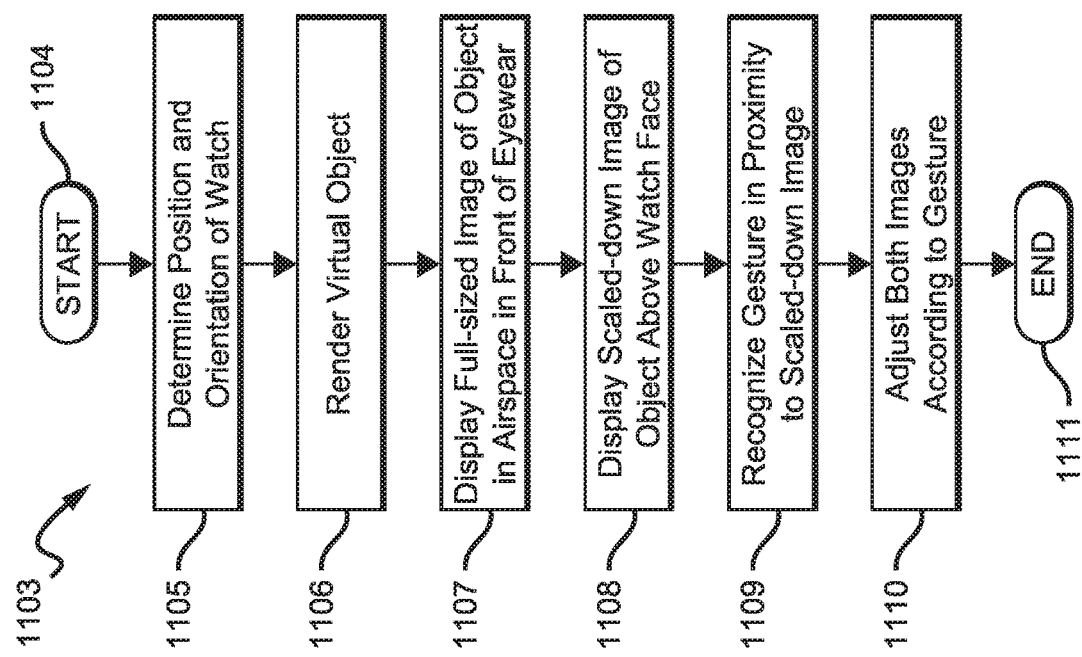
FIG. 11a is a flowchart for creating and interacting with a scaled duplicate interface.
Figure 11:
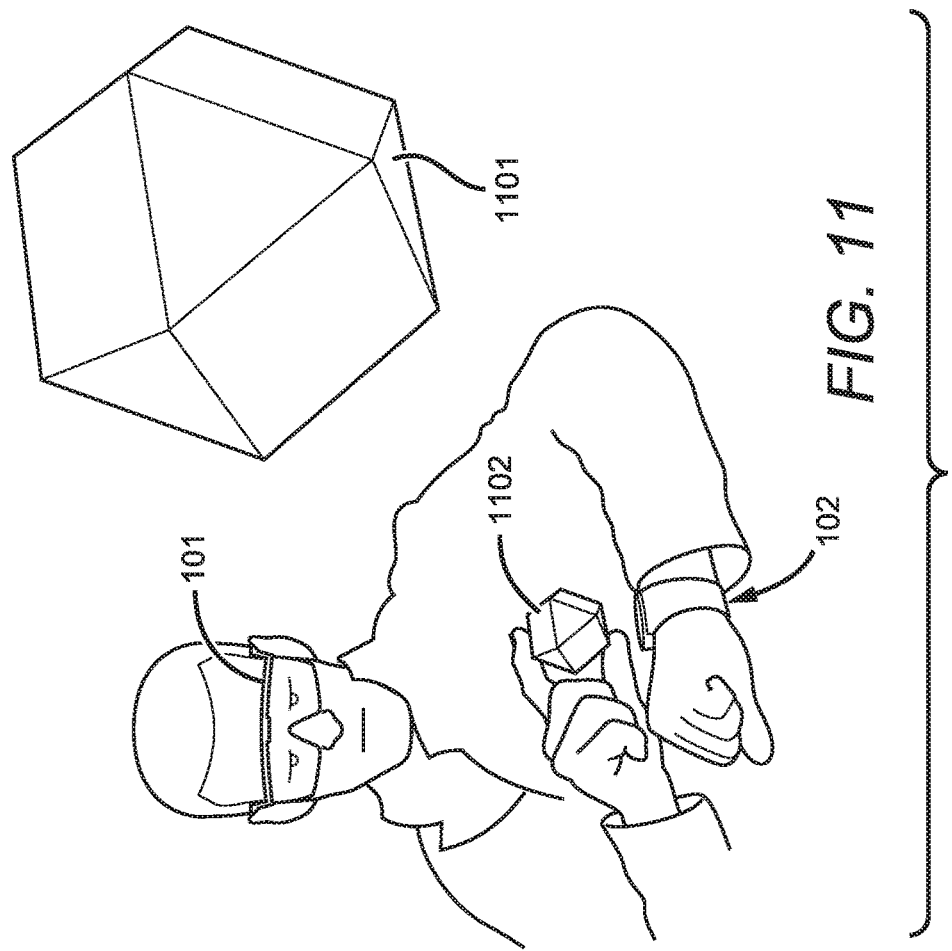
FIG. 11 illustrates a user interacting with a scaled duplicate interface.

FIG. 11 illustrates a user interacting with a scaled duplicate interface. In FIG. 11, the user wears an augmented reality eyewear device 101 and a wristwatch 102. The augmented reality eyewear device 101 may display a larger three-dimensional image 1101 in front of the user and a scaled-down version 1102 of said three-dimensional image 1101 above the watch face of a user's wristwatch 102. The user may then interact with the scaled version 1102 of the image by making smaller gestures in the three-dimensional space above the user's wristwatch 102. The scaled down version of the object may not be an exact duplicate of the object. It may be of lower resolution to conserve processing power or be shown as a wire frame to indicate to the user that the scaled-down version is to be used as a control. A menu interface may be displayed near the scaled-down version that allows the user to interact with the full-sized object in various ways. For example, an option available in a menu may be a paint-wheel by which a user may change the color of an object.

FIG. 11 a is a flowchart of a sequence 1103 for creating and interacting with a scaled duplicate interface. A user wears an augmented reality eyewear device and a wristwatch. In step 1104 a scaled duplicate interface is initiated. The augmented reality eyewear determines 1105 the position and orientation of the user's watch. In step 1106 the augmented reality eyewear renders a virtual object. In step 1107 the augmented reality eyewear displays a full-sized version of the object in the airspace in front of the user. In step 1108 the augmented reality eyewear displays a scaled-down version of the object above the face of the user's watch. In step 1109 the augmented reality eyewear recognizes a gesture made in proximity to the scaled down object. The application interprets the gesture as though it were made in a location and scale relative to the full-sized image and adjusts 1110 both the full-sized object and scaled-down object accordingly. The sequence is then completed 1111. This sequence may be continually repeated for the entire time that a scaled duplicate interface is desired by a user.

A scaled duplicate interface may be activated and associated with a particular object in a number of ways. As a first example, when a user adds a new virtual object to the scene, the scaled duplicate interface may be activated and may be linked to the new virtual object. As a second example, if a user were walking through the physical world and came into close proximity with a object that the user could control or influence, the scaled duplicate interface may be activated and may be linked with the object that is now in close proximity. In this second example, the object that comes into proximity may be either a virtual or a real object. As a third example, a user may actively select a particular virtual or real object. A user may actively select an object by voice command, through a menu interface, through an application launcher interface, or by making a gesture, such as pointing, in relation to the object. Non-gestural means of selection, such as voice command or selection from a menu interface may be of particular use in selecting objects that are not within the scene, such as a scaled duplicate version of a user's home while a user is on vacation.

In the instances where the scaled duplicate image is an image of a real physical object, the scaled duplicate interface may automatically update its appearance to match the appearance of the real object. For example, if the object is the user's self-driving automobile, the scaled duplicate image may be adjusted based on the movements of the physical car. When the car goes around a curve, the wheels on the scaled-duplicate image may move in corresponding fashion and the orientation of the car may shift. Attempts by the user to control the interface may or may not control the real object. For example, a user may open the trunk of the vehicle by tapping on the trunk of the scaled-duplicate image. A scaled duplicate interface may be particularly useful in industrial applications. For example, robotic arms could manipulate a real physical object in corresponding fashion to a user's manipulation of a scaled-duplicate image of said real physical object.

Augmented Reality Eyewear Interaction with Smartwatches

A user need not wear a specially designed wristwatch in order to interact with augmented reality eyewear through a wristwatch anchored user interface. A user may have various different styles of watch depending on aesthetic preference and may change watches as frequently as desired. In fact, a user may wear any analog or digital wristwatch and experience many of the benefits of a wristwatch-anchored interface. As virtual images and interfaces are overlaid onto a user's standard wristwatch, the wristwatch may act as a simulated smartwatch and the user may interact with their standard wristwatch as though it were a smartwatch.

A user may also wear a "real" smartwatch to interact with an anchored interface of an augmented reality eyewear device. A smartwatch's own components may contribute to the utility of the augmented reality eyewear device. For example, a smartwatch's inertial measurement unit may communicate via Bluetooth with the augmented reality eyewear device in order to assist the augmented reality eyewear device in determining the location and orientation of the smartwatch. Moreover, augmented reality eyewear devices may be slimmer, less expensive, and their batteries may last longer if the eyewear relies on a smartwatch for sensing or processing.

A smartwatch may contain a heartrate monitor that is capable of tracking a user's heartrate. Such heartrate monitors may use photoplethysmography, pressure sensors, or other sensing components to measure changes in blood flow and blood pressure near the user's wrist. Heartrate data may then be passed to an augmented reality eyewear device that is worn by the user and the augmented reality eyewear device may display a real-time heartrate monitor along with various statistics that may be derived from the user's heartrate. The displayed information may be displayed either in close proximity to the watch, or in a fixed part of the user's view through the augmented reality eyewear. For example, heartrate information may be displayed in the upper-left corner of the scene. A smartwatch may also be equipped with sensors to monitor pulse oximetry, blood glucose data, body temperature, galvanic skin response or other biometric data. Sensors may even be able to detect the onset of seizures or of diseases such as colds or fevers. Such data may be displayed by augmented reality eyewear in similar fashion as heartrate data. Additionally, important alerts, such as a diabetic having low blood glucose, may pop up near the center of the user's vision to get the user's attention. Augmented reality eyewear software and displays should be designed such that a user's field of vision is not unduly obstructed while the user is engaged in dangerous activities such as driving or operating machinery.

Combined Smartwatch and Augmented Reality Eyewear Displays

Current augmented reality eyewear technology may not be capable of producing images with as much brightness, color contrast, and resolution as current smartwatch displays. Therefore, a user that wears both a smartwatch and an augmented reality eyewear device may prefer to use the smartwatch display for certain functions. Similarly, the touchscreen sensors of a smartwatch may more accurately capture finger movement than the sensing components of an augmented reality eyewear device.

Figure 12:
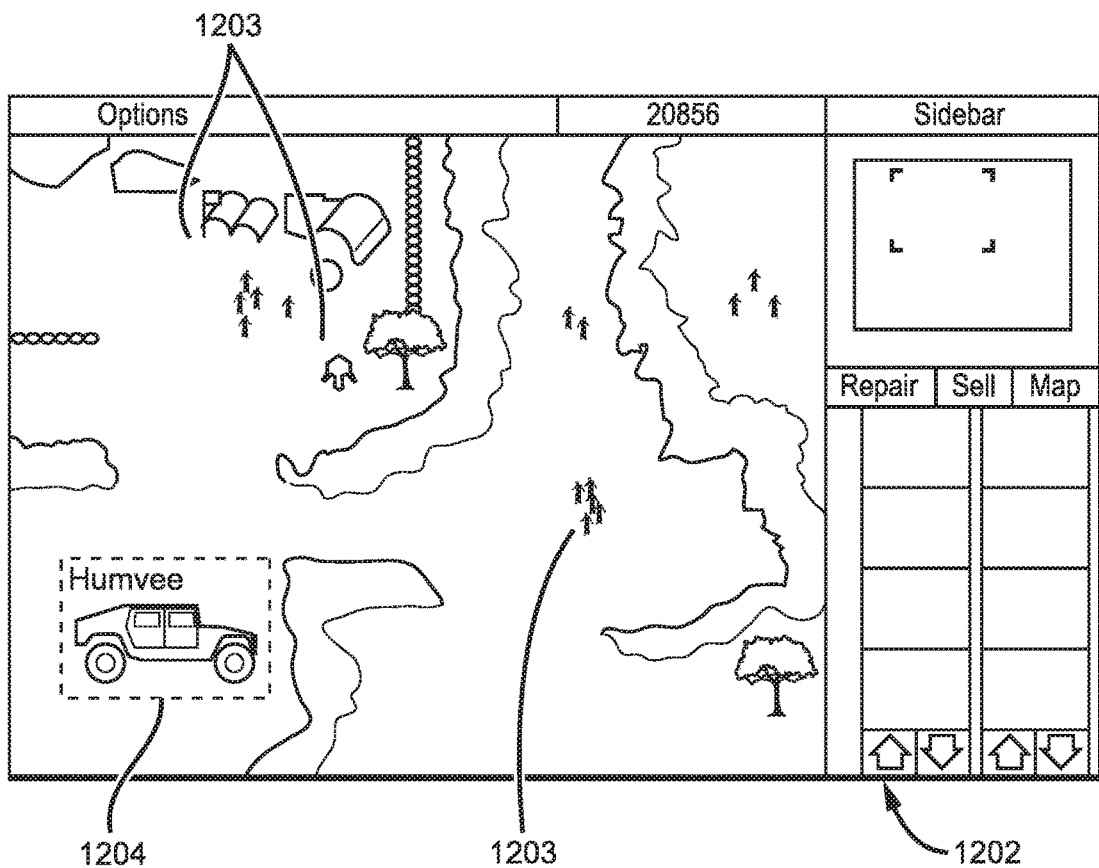
FIG. 12 illustrates an example of a combined smartwatch and augmented reality eyewear display, as such would appear to a user wearing augmented reality eyewear.
Figure 12:
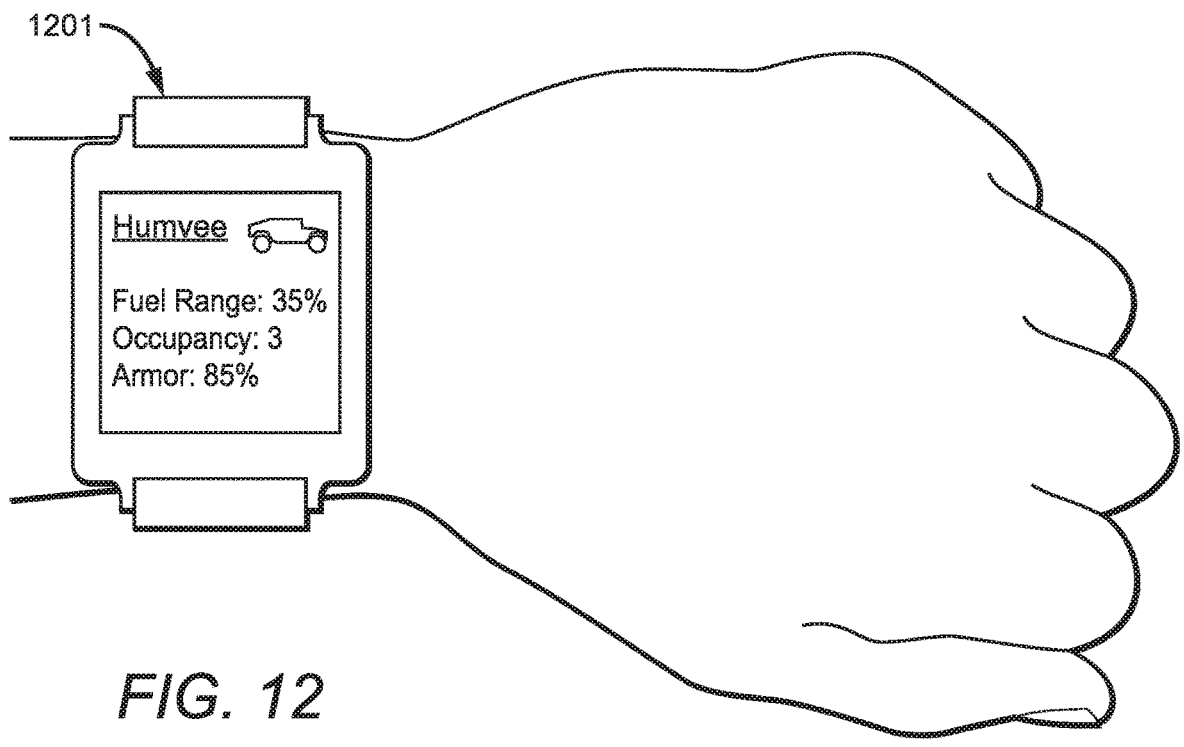

FIG. 12 illustrates an example of a combined smartwatch and augmented reality eyewear display, as such would appear to a user wearing augmented reality eyewear. In FIG. 12, a user wears an augmented reality eyewear device and a smartwatch and is engaged in playing a military strategy game. The augmented reality eyewear device may display a map 1202 of a battlefield in the airspace above the user's smartwatch. In FIG. 12, various icons 1203 representing military personal and vehicles are displayed on the battlefield map. When a user selects on of these icons 1203, statistics and information relating to the selected item may appear on the user's smartwatch 1201. For example, in FIG. 12, the user has selected a Humvee icon 1204 on the battlefield and statistics for the Humvee, including the Humvee's occupancy, fuel range, and armor rating are displayed on the user's smartwatch 1201. As such, the two devices may display complimentary elements of the graphical user interface of a single application. A user may interact with the graphical user interface both by touching the smartwatch and by making gestures with respect to the augmented reality display.

Figure 13:
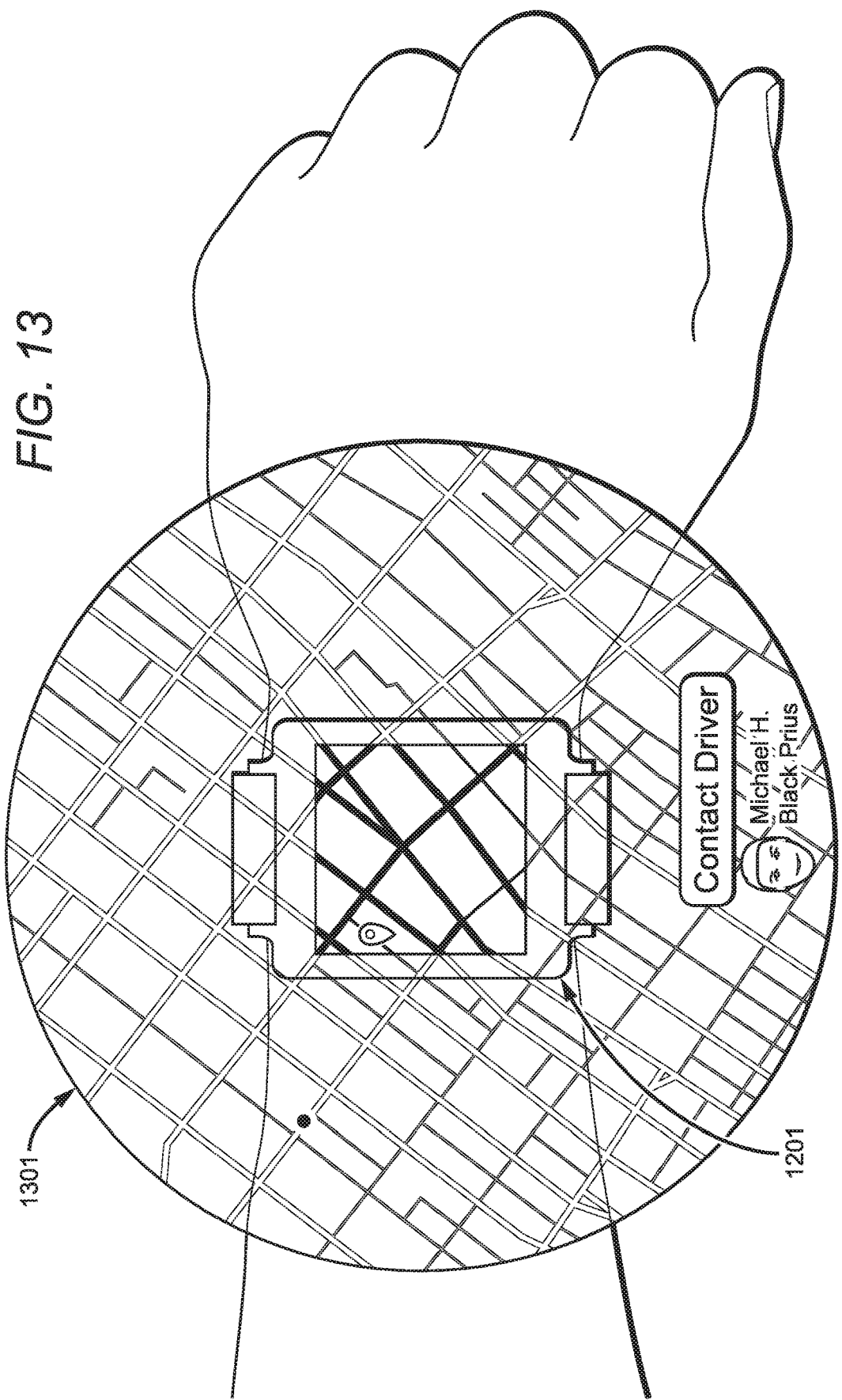
FIG. 13 illustrates an example of a smartwatch and augmented reality eyewear display, combined into a continuous display.

The displays of a smartwatch and augmented reality may also be combined as one continuous display. FIG. 13 illustrates an example of a smartwatch and augmented reality eyewear display, combined into a continuous display. In FIG. 13, a navigation application is run simultaneously on a smartwatch 1201 and an augmented reality eyewear device. A portion of the graphical user interface is displayed by the augmented reality eyewear device and a portion is displayed by the smartwatch 1201 such that the displays appear as one continuous display.

For example, augmented reality eyewear may display the map portion of a graphical user interface 1301 of a rideshare application. As the user moves the face of the smartwatch 1201 into the area in which the graphical user interface 1301 of the map is displayed, the augmented reality eyewear may cease to display the portion of the graphical user interface that is occupied by the smartwatch and the smartwatch may instead display the corresponding portion of the graphical user interface. The user may control both the augmented reality eyewear display and the smartwatch display by, for example, swiping or pinching the display of the smartwatch or by making hand gestures in the air in close proximity to either the smartwatch or to the graphics displayed by the eyewear. Some smartwatch displays may be brighter and more vivid than some augmented reality eyewear displays. The edges of the smartwatch display may be faded such that the transition from smartwatch display to augmented reality eyewear display is more gradual or a perimeter of a predetermined width may be left blank around the outline of the smartwatch. Alternatively, augmented reality eyewear may simply dim the portion of the display that would appear above the display of the smartwatch.

Figure 13A:
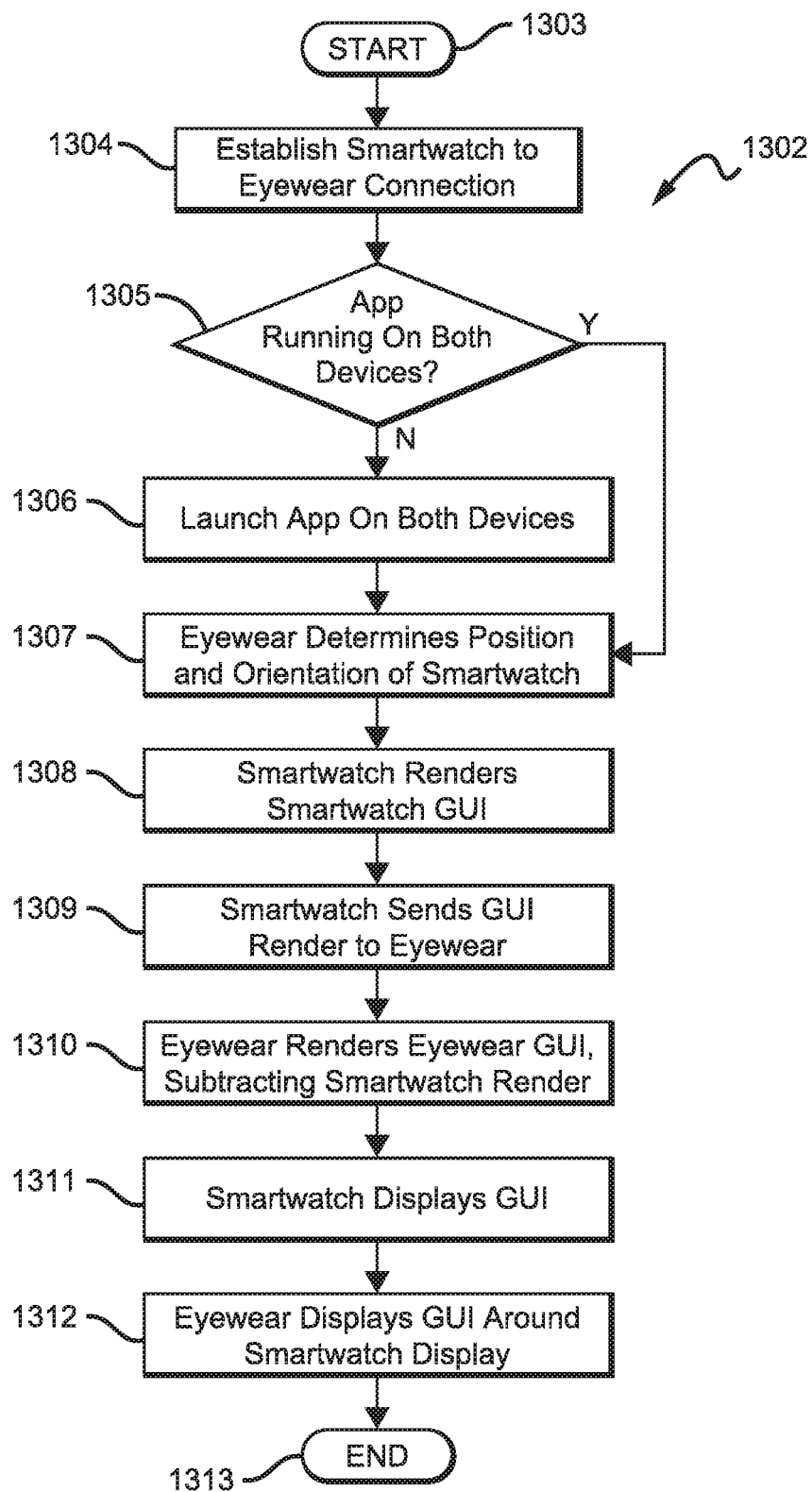
FIG. 13a is a flowchart for combining the displays of an augmented reality eyewear device and a smartwatch into a continuous display.

FIG. 13a is a flowchart of a sequence 1302 for combining the displays of an augmented reality eyewear device and a smartwatch into a continuous display. A user wears an augmented reality eyewear device and a wristwatch. In step 1303 a combined-continuous-display sequence is initiated. The augmented reality eyewear device and smartwatch establish 1304 a connection. In step 1305 the augmented reality eyewear device checks to determine whether the desired application is running on both devices. If the application is not running on a device, that device launches 1306 the application. Once both devices are running the desired application, the eyewear determines 1307 the position and orientation of the smartwatch. In step 1308 the smartwatch renders a graphical user interface to be displayed on the smartwatch. The smartwatch sends 1309 the rendering to the eyewear. In step 1310 the eyewear renders a graphical user interface to be displayed on the eyewear and subtracts the smartwatch rendering from the eyewear rendering. The smartwatch then displays 1311 the rendering of the smartwatch graphical user interface and the eyewear displays 1312 the rendering of the eyewear graphical user interface with the smartwatch graphical user interface being subtracted such that the displays of both devices appear as one continuous display. As the devices move in relation to each other, the eyewear will need to continuously determine the position of the smartwatch and subtract appropriate portions of its own GUI in order to maintain the appearance of one continuous display across both devices. The sequence is then completed. This sequence may be continually repeated for the entire time that a combined display is desired.

Various configurations of application processing may be utilized by a smartwatch and augmented reality eyewear device in order to simultaneously display the same application. As described above, both devices may run the full version of the application simultaneously. Alternatively, the devices may interact as a master-slave, in that one performs the processing and controls the display of another device. Similarly, one device may perform a majority, but not all of the application processing.

Combining the display of a smartwatch with the display of augmented reality eyewear may present substantial benefits for applications such as web browsers, map applications, or games with virtual terrain or a virtual map.

Tracking Gestures in Combined Displays

When two devices are used to simultaneously run the same application, both devices may detect input from a user such as gestures or touch. In order to continue to run the application, the devices must resolve the question of which input should control the application. Some smartwatches may be able to detect gesture made in the vicinity of the smartwatch, even if the watch is not touched, by using sensors similar to those used by augmented reality eyewear.

Figure 14:
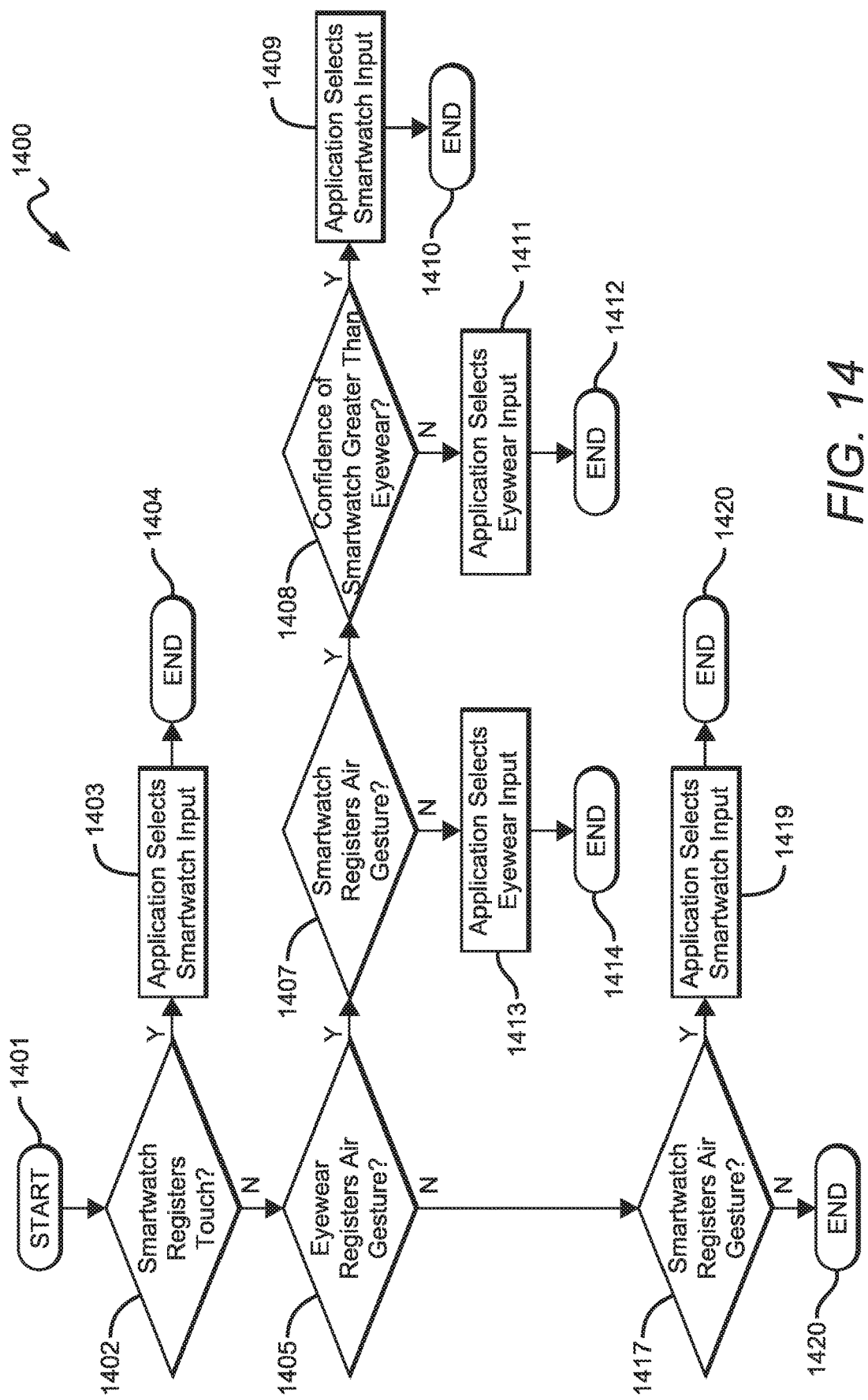
FIG. 14 is a flowchart for a sequence to choose between input from an augmented reality eyewear device and a smartwatch.

FIG. 14 is a flowchart of a sequence 1400 for reconciling between input from an augmented reality eyewear device and a smartwatch. In step 1401 an augmented reality eyewear device and a smartwatch simultaneously run and display an application. If the smartwatch registers 1402 a touch, the application selects 1403 the input from the smartwatch and no further reconciliation is needed and the sequence is completed 1404. If no touch is registered by the smartwatch and the augmented reality eyewear determines 1405 whether it has registered an air gesture. If the eyewear has registered an air gesture, the smartwatch determines 1407 whether it has registered an air gesture. If the smartwatch has also registered an air gesture each device interprets the gesture and ascribes a confidence value to the gesture, indicating the probability that the interpreted gesture is the gesture that the user actually made. In step 1408, the devices compare the confidence values. If the confidence of the smartwatch is greater than the confidence of the augmented reality eyewear, the application selects 1409 the input from the smartwatch and the sequence is completed 1410. If the confidence of the smartwatch is no greater than the confidence of the augmented reality eyewear, the application selects 1411 the input from the augmented reality eyewear and the sequence is completed 1412. If the smartwatch does not register an air gesture, but the augmented reality eyewear does register an air gesture, the application selects 1413 the input from the augmented reality eyewear and the sequence is completed 1414. If no air gesture is registered by the augmented reality eyewear, the devices move to step 1417. In step 1417 the smartwatch determines whether it has registered an air gesture. If the smartwatch has registered an air gesture the application selects 1418 the smartwatch input and the sequence is completed 1419. If the smartwatch determines that it has not registered an air gesture, the sequence is completed 1420.

3D Application Launcher

Devices capable of running multiple applications and functions may have a launching interface by which a user may view data output and may select applications or functions for the device to run. A launching interface of an augmented reality eyewear device may be displayed in three-dimensional space. A launching function may display information such as time, battery life and internet connectivity. A launching interface may also display application icons that a user may tap or swipe to launch an application. A launching interface may also display recently viewed or bookmarked webpages.

A launching interface may also display widgets, whose appearance and data output may change. An example of a widget may be a weather widget that appears as a three-dimensional cloud when the weather is cloudy, a three dimensional sun when the weather is sunny or a three dimensional lightning bolt when a thunder storm is in progress. A user may interact with a widget without leaving the launcher interface. For example, augmented reality eyewear may display a 3D widget of a user's automobile. A user may be able to start the car from the launcher interface by making a key-turning gesture near the car widget, or open the trunk of the car by tapping the trunk on the car widget. In another example, a user may be able to turn on the user's sprinkler system by tapping a sprinkler widget. In turn, the sprinkler widget may display water droplets to indicate that the sprinkler system was successfully turned on. Given that a launcher may contain many icons and widgets, widgets may appear too small for a user to interact with in a granular way, such as tapping the trunk of a car widget. A user may enlarge a particular widget for easier interaction by tapping once on the widget.

When a user wears an augmented reality eyewear device along with a wristwatch, the launching interface of the augmented reality eyewear device may relate to the user's wristwatch in various ways. In one example icons, widgets, and device status data may appear to float as three-dimensional objects in proximity to a user's wristwatch. Such objects may maintain a fixed position and orientation relative to the wrist upon which the watch is worn. Alternatively, such objects may maintain a fixed position and orientation relative to the user's wristwatch. Alternatively, such objects may maintain a fixed position relative to the wristwatch bearing wrist, but the orientation of such objects may be fixed relative to another reference point such as the horizon or the user's head. Alternatively, objects may be positioned and orientated based on a combination of the above-mentioned methods. For example, when a user rotates their wrist, an object may rotate, but the rotation may be to a lesser degree in order for the object to be more closely oriented with another point of reference such as the horizon or the user's head.

Figure 15:
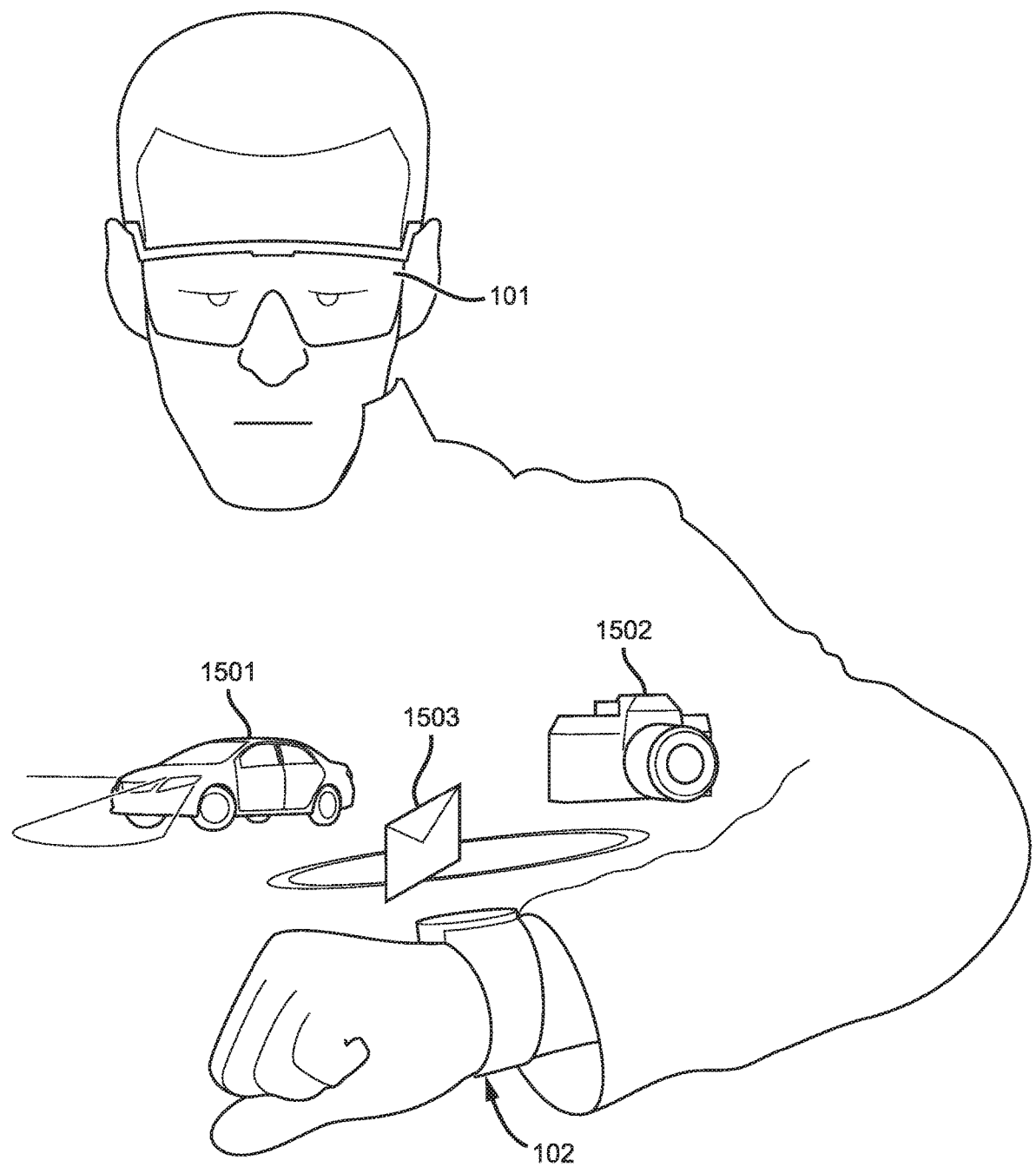
FIG. 15 illustrates an example of a 3D launcher interface.

In FIG. 15 an augmented reality eyewear device displays a 3D launcher interface in proximity to a user's wristwatch. In FIG. 15, the 3D launcher interface displays a car widget 1501, a camera icon 1502 and a mail icon 1503. In FIG. 15, the headlights of the car widget 1501 appear to be in an on position, demonstrating that the headlights of the user's corresponding car in the real world are on.

Smarthome

Various smart devices within homes, offices and other buildings may possess the capability of communicating with the internet or other devices. For example, on a hot summer day, a thermostat may communicate with automated windows such that windows are opened in the evening, once outside temperatures drop, in order to cool the house without using air conditioning. An augmented reality eyewear device may be configured to communicate with and monitor such smart devices. An augmented reality eyewear device may display an interactive map of a user's home or office that identifies various smart devices. A user may tap a smart device on said may to view more detailed information regarding the device and adjust device settings. When a user taps a smart device information, icons and settings may appear to float above the map, if the map is two dimensional, or outside of the map, if the map is three dimensional.

In various applications that involve maps, such as strategy games and navigation applications, users may interact with points on a map in a similar fashion as described above for a smart home application. Selecting an item or location on a map may cause objects and information to pop up and appear to float above or near the item that was selected on the map.

CONCLUSIONS RAMIFICATIONS AND SCOPE

Accordingly, the reader will see that anchoring the graphical user interface of an augmented reality eyewear device to a wristwatch or using a wristwatch as a means of input for an augmented reality eyewear device may improve the functioning of augmented reality eyewear and allow for more socially acceptable and more intuitive gestural input. The reader will also see that combining the displays of a smartwatch and an augmented reality eyewear device presents various benefits. Furthermore, advantages of a wristwatch based interface for an augmented reality eyewear device may include:

a. An intuitive means of user input and interaction with augmented reality eyewear.

b. A means of input that does not require the user to make gestures in open airspace directly in front of the user, which may lead to awkward social interactions and confusion. The means of input described herein may simulate more socially acceptable gestures such as a user adjusting a standard wristwatch or interacting with a smartwatch.

c. A planar shift input mechanism using gestural input for augmented reality eyewear. Such an input mechanism may be intuitive for users who have experience with desktop or laptop computers.

d. A virtual control panel for various augmented reality applications that is anchored to an item of fashion that many users may already have, thus requiring no additional purchases on behalf of the user. This also allows the user to dress in the style and fashion of the user's choosing.
e. A method of interacting with large virtual objects by making small gestures near a wristwatch instead of making sweeping gestures in the open airspace in front of the user.

While the above description contains many specificities, these should not be construed as limitations on the scope, but rather as exemplification of one or several embodiments thereof. Many other variations and operations are possible. For example:
a. The interface of an augmented reality eyewear device may be anchored to a bracelet, a sleeve cuff, a tattoo, or the user's bare wrist or forearm. The augmented reality eyewear device may even display a virtual image of a smartwatch on the user's bare wrist that the user may interact with.
b. The interface of an augmented reality eyewear device may be anchored to the palm of a user's hand. This would simulate a user interacting with a smartphone or tablet. If the user has a smartphone or tablet, the interface could be anchored to such a device as well. This again would reduce awkward social interactions and the confusion of third parties.
c. Various components of the augmented reality eyewear device may be decentralized or may no longer be necessary as technology advances. For example, an augmented reality eyewear device may rely on the processing power of a user's smartphone or on the sensing components of a user's smartphone. Augmented reality eyewear may have fewer or additional components than those discussed herein. Moreover, components may be combined or relocated.
d. Detachable sensing or emitting components may be affixed to a wristwatch in order to increase the speed and accuracy at which an augmented reality eyewear device models the location of the wristwatch.
e. The disclosure sets forth various examples of computer applications that may benefit from the disclosed systems and methods. However, many other computer applications may benefit from the disclosed systems and methods.

Accordingly, the scope should be determined not by the embodiments illustrated, but by the appended claims and their legal equivalents.

What is claimed is:

1. An augmented reality eyewear device implemented method for user interface comprising:
   determining positional information related to a physical object;
   displaying an augmented reality graphical user interface of an application, the augmented reality graphical user interface is anchored to the physical object;
   wherein the augmented reality graphical user interface appears to the user to be displayed in a first plane;
   detecting a user gesture made in a second plane, the second plane is anchored to the physical object and is parallel to a surface of the physical object, the first plane and the second plane are not parallel;
   rotating the user gesture such that the rotated user gesture is parallel to the first plane; and
   interpreting the rotated user gesture as input for the augmented reality graphical user interface.
2. The method of claim 1, wherein the positional information comprises orientation of the physical object.

3. The method of claim 1, wherein the positional information comprises location of the physical object.
4. The method of claim 1, wherein the physical object is a wrist of a user of the application.
5. The method of claim 1, wherein the physical object is a wristwatch worn by the user of the application.
6. The method of claim 1, wherein the physical object is a hand of a user of the application.
7. The method of claim 1, wherein the physical object is worn by a user of the application.
8. The method of claim 1 wherein the first plane and the second plane are substantially perpendicular.
9. The method of claim 1 wherein the augmented reality eyewear device does not display a second augmented reality graphical user interface that appears to the user to be substantially parallel to the second plane.
10. A system comprising:
    one or more processors; and
    a non-transitory computer readable storage medium comprising instructions that when executed by the one or processors cause the one or more processors to perform operations comprising:
    determining positional information related to a physical object,
    displaying an augmented reality graphical user interface of an application, the augmented reality graphical user interface is anchored to the physical object;
    wherein the augmented reality graphical user interface appears to the user to be displayed in a first plane;
    detecting a user gesture made in a second plane, the second plane is anchored to the physical object and is parallel to a surface of the physical object, the first plane and the second plane are not parallel;
    rotating the user gesture such that the rotated user gesture is parallel to the first plane; and
    interpreting the rotated user gesture as input for the augmented reality graphical user interface.
11. The method of claim 10 wherein the positional information comprises orientation of the physical object.
12. The method of claim 10, wherein the positional information comprises location of the physical object.
13. The method of claim 10, wherein the physical object is a wrist of a user of the application.
14. The method of claim 10, wherein the physical object is a wristwatch worn by the user of the application.
15. The method of claim 10, wherein the physical object is a hand of a user of the application.
16. The method of claim 10, wherein the physical object is worn by a user of the application.
17. The method of claim 10, wherein the first plane and the second plane are substantially perpendicular.
18. The method of claim 10, wherein the augmented reality eyewear device does not display a second augmented reality graphical user interface that appears to the user to be substantially parallel to the second plane.
19. A machine-readable non-transitory storage medium having instruction data executable by a machine to cause the machine to perform operations comprising:
    determining positional information related to a physical object;
    displaying an augmented reality graphical user interface of an application, the augmented reality graphical user interface is anchored to the physical object;
    wherein the augmented reality graphical user interface appears to the user to be displayed in a first plane;
    detecting a user gesture made in a second plane, the second plane is anchored to the physical object and is parallel to a surface of the physical object, the first plane and the second plane are not parallel;
rotating the user gesture such that the rotated user gesture is parallel to the first plane; and
interpreting the rotated user gesture as input for the augmented reality graphical user interface.

* * * * *

UNITED STATES PATENT AND TRADEMARK OFFICE
CERTIFICATE OF CORRECTION

PATENT NO. : 11,143,867 B2
APPLICATION NO. : 16/743410
DATED : October 12, 2021
INVENTOR(S) : Rodriguez, II Page 1 of 1

It is certified that error appears in the above-identified patent and that said Letters Patent is hereby corrected as shown below:

In the Claims

In Column 20, Line 21, in Claim 10, before "processors", insert --more--

In Column 20, Line 24, in Claim 10, delete "object," and insert --object;-- therefor Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*